(12) United States Patent
Yamanoi et al.

(10) Patent No.: US 10,339,805 B2
(45) Date of Patent: Jul. 2, 2019

(54) TRAFFIC LIGHT RECOGNITION DEVICE AND TRAFFIC LIGHT RECOGNITION METHOD

(71) Applicant: Nissan Motor Co., Ltd., Yokohama-shi, Kanagawa (JP)

(72) Inventors: Daiki Yamanoi, Kanagawa (JP); Haruo Matsuo, Kanagawa (JP); Takahiko Oki, Kanagawa (JP); Akira Suzuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/743,072

(22) PCT Filed: Jul. 13, 2015

(86) PCT No.: PCT/JP2015/070041
§ 371 (c)(1),
(2) Date: Jan. 9, 2018

(87) PCT Pub. No.: WO2017/009933
PCT Pub. Date: Jan. 19, 2017

(65) Prior Publication Data
US 2018/0365991 A1  Dec. 20, 2018

(51) Int. Cl.
*G06K 9/00* (2006.01)
*G08G 1/0962* (2006.01)
(Continued)

(52) U.S. Cl.
CPC ........ *G08G 1/09623* (2013.01); *B60R 11/04* (2013.01); *G06K 9/00818* (2013.01);
(Continued)

(58) Field of Classification Search
None
See application file for complete search history.

(56) References Cited

U.S. PATENT DOCUMENTS 9,176,500 B1 * 11/2015 Teller ............... G05D 1/0088
9,389,093 B2    7/2016 Kojo
(Continued)

FOREIGN PATENT DOCUMENTS

JP    H11306489 A    11/1999
JP    2003151042 A    5/2003
(Continued)

*Primary Examiner* — Kevin Ky
(74) *Attorney, Agent, or Firm* — Young Basile Hanlon & MacFarlane, P.C.

(57) ABSTRACT

A traffic light recognition device includes: an imaging attitude setting unit configured to set an imaging direction of the camera on the basis of a position on the image of the traffic light and of a moving direction in the future on the image of the traffic light; a camera attitude controller configured to change the imaging direction of the camera to an imaging direction set by an imaging direction setting unit; and a traffic light recognition unit configured to recognize the traffic light from an image captured in the imaging direction by the camera. The traffic light recognition device is capable of accurately detecting the lighting state of a traffic light without being affected by the attitude of a camera.

8 Claims, 16 Drawing Sheets

(51) Int. Cl.
*H04N 5/225* (2006.01)
*B60R 11/04* (2006.01)

(52) U.S. Cl.
CPC ......... *G06K 9/00825* (2013.01); *H04N 5/225* (2013.01); *B60W 2550/22* (2013.01); *G06T 2207/30256* (2013.01)

(56) References Cited

U.S. PATENT DOCUMENTS

| | | | |
|---|---|---|---|
| 2002/0080998 A1* | 6/2002 | Matsukawa | G06K 9/00818 382/103 |
| 2010/0033571 A1* | 2/2010 | Fujita | B60W 40/02 348/149 |
| 2012/0253629 A1* | 10/2012 | Maruyama | G08G 1/22 701/96 |
| 2013/0251209 A1* | 9/2013 | Kim | G06K 9/00791 382/106 |
| 2013/0253754 A1* | 9/2013 | Ferguson | G05D 1/0231 701/28 |
| 2013/0335579 A1* | 12/2013 | Raghavan | G06K 9/00825 348/188 |
| 2014/0186049 A1* | 7/2014 | Oshima | H04B 10/1143 398/118 |
| 2015/0039212 A1 | 2/2015 | Kido | |
| 2015/0235094 A1* | 8/2015 | Kraeling | G06K 9/00791 348/148 |
| 2015/0235485 A1* | 8/2015 | Nemat-Nasser | G07C 5/08 701/1 |
| 2016/0054138 A1* | 2/2016 | Kojo | G06T 7/60 701/423 |
| 2016/0196656 A1* | 7/2016 | Cund | B60W 40/06 348/148 |
| 2016/0311431 A1* | 10/2016 | Kato | B62D 1/28 |
| 2016/0335892 A1* | 11/2016 | Okada | B60T 7/22 |
| 2017/0243518 A1* | 8/2017 | Kanemaru | G06F 17/30 |
| 2017/0313297 A1* | 11/2017 | Okada | G08G 1/09 |

FOREIGN PATENT DOCUMENTS

| | | |
|---|---|---|
| JP | 2007288444 A | 11/2007 |
| WO | 2008038370 A1 | 4/2008 |
| WO | 2014162797 A1 | 10/2014 |

* cited by examiner

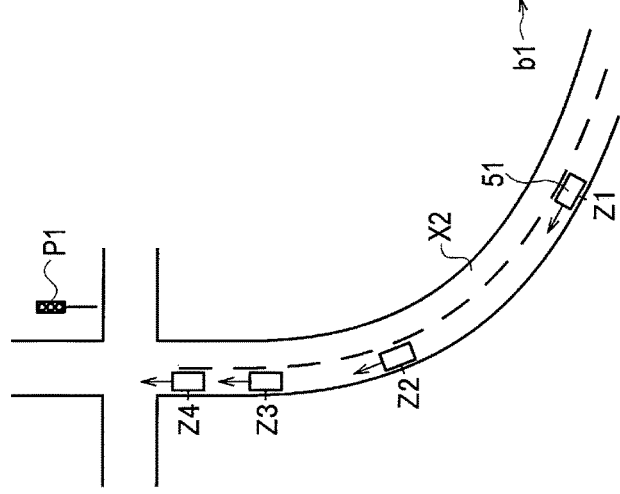

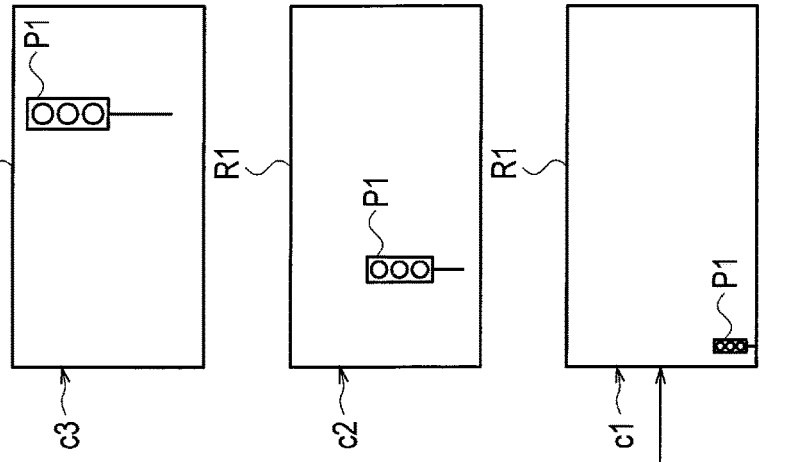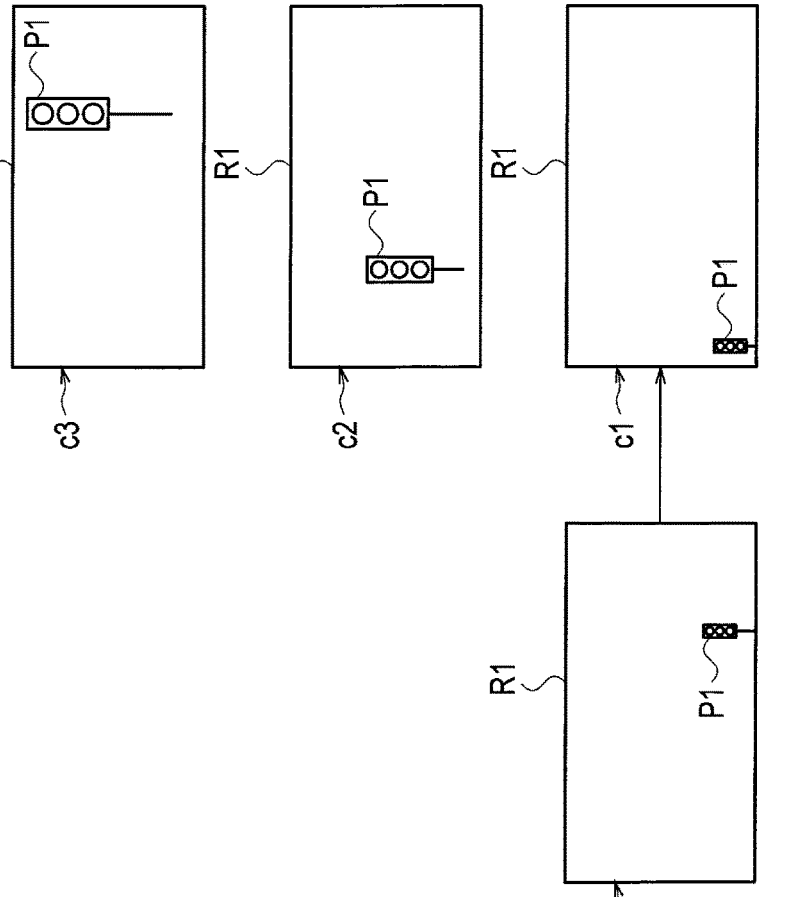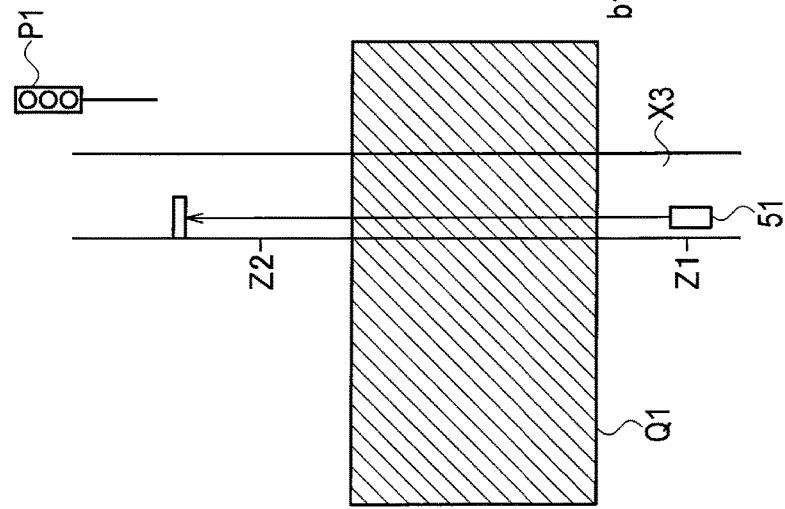

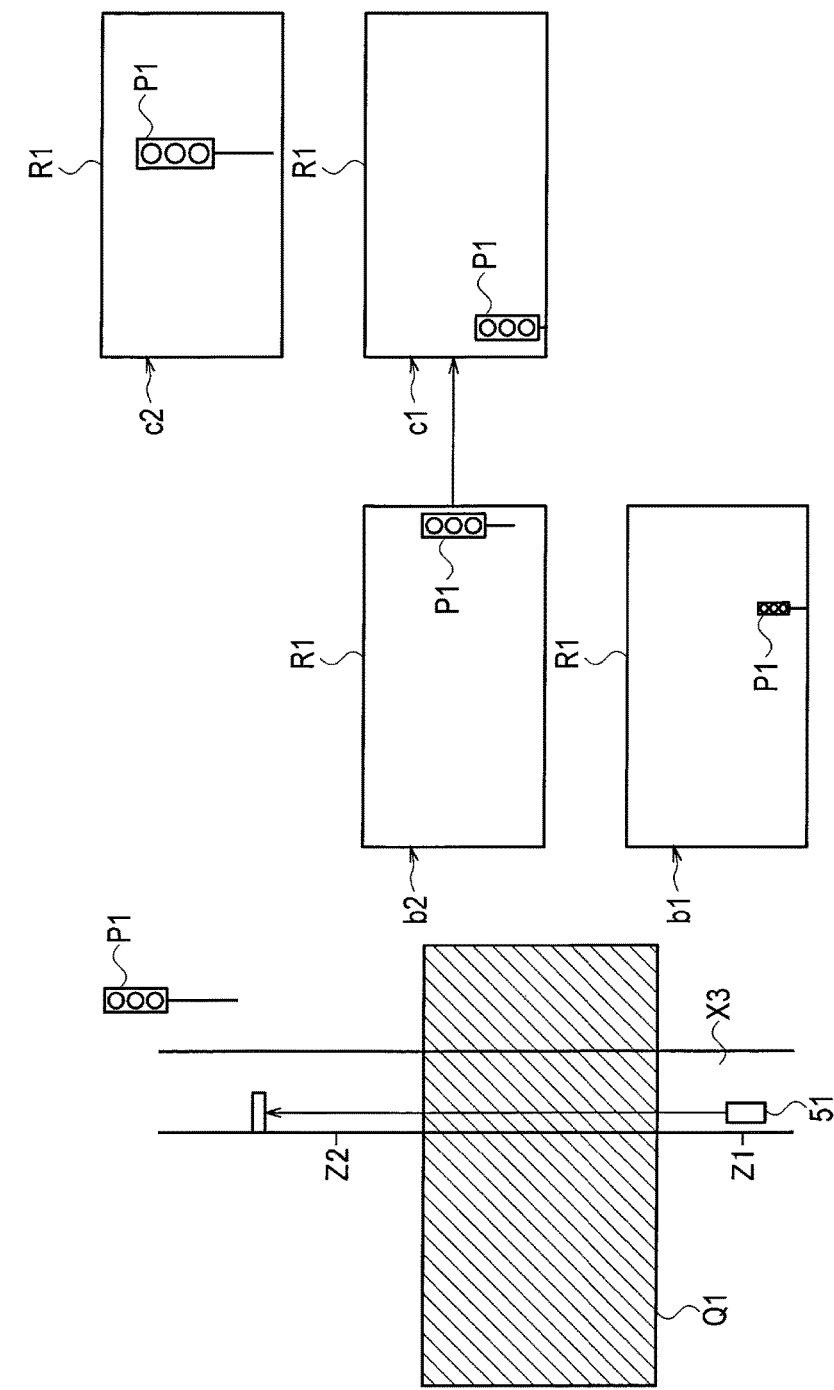

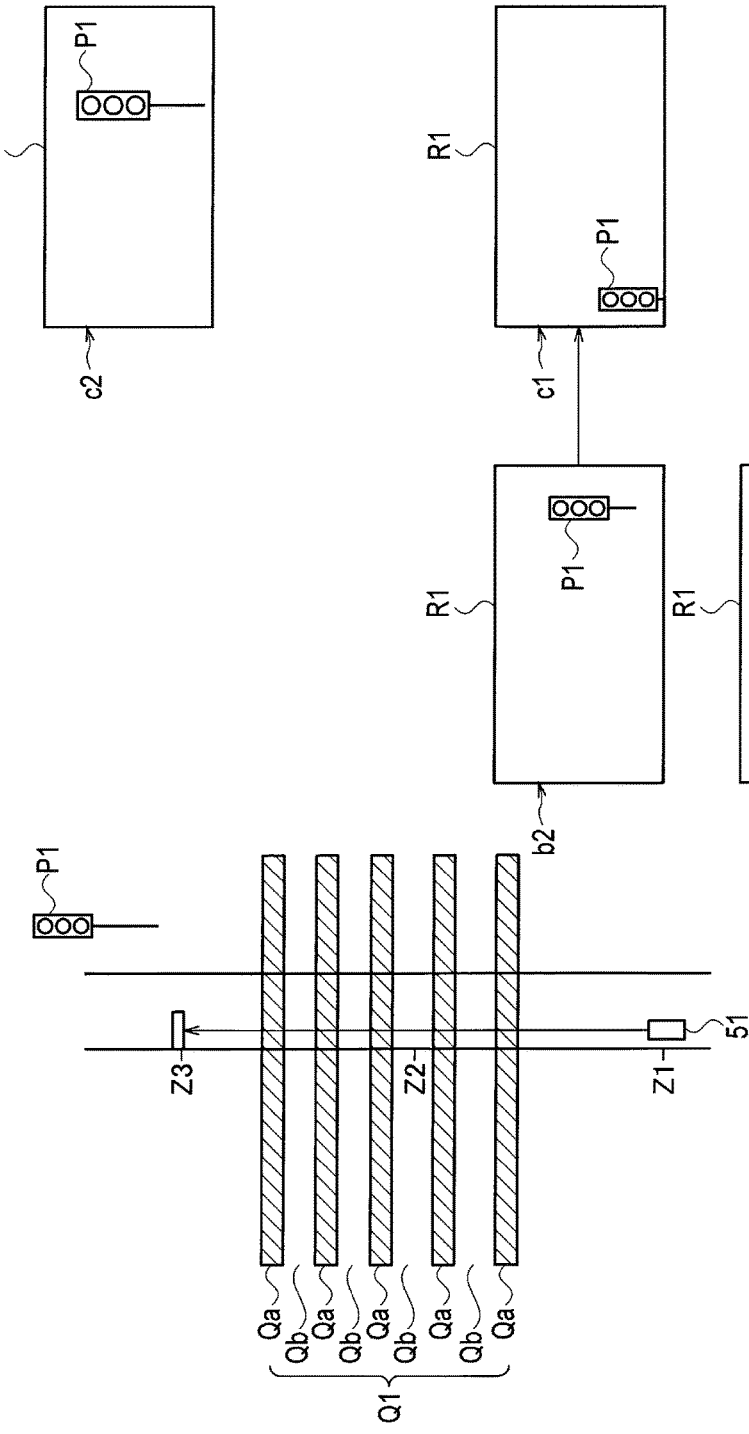

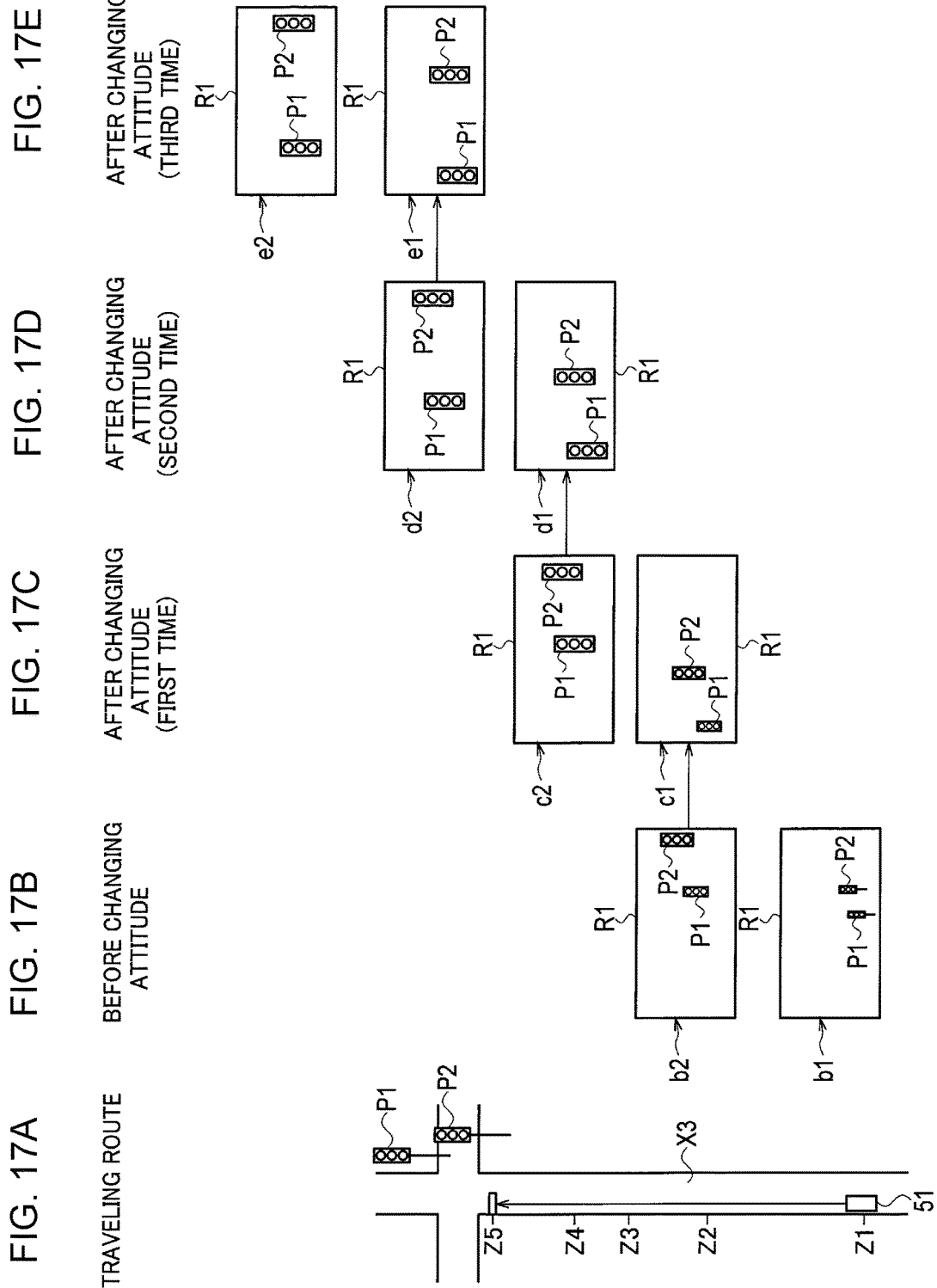

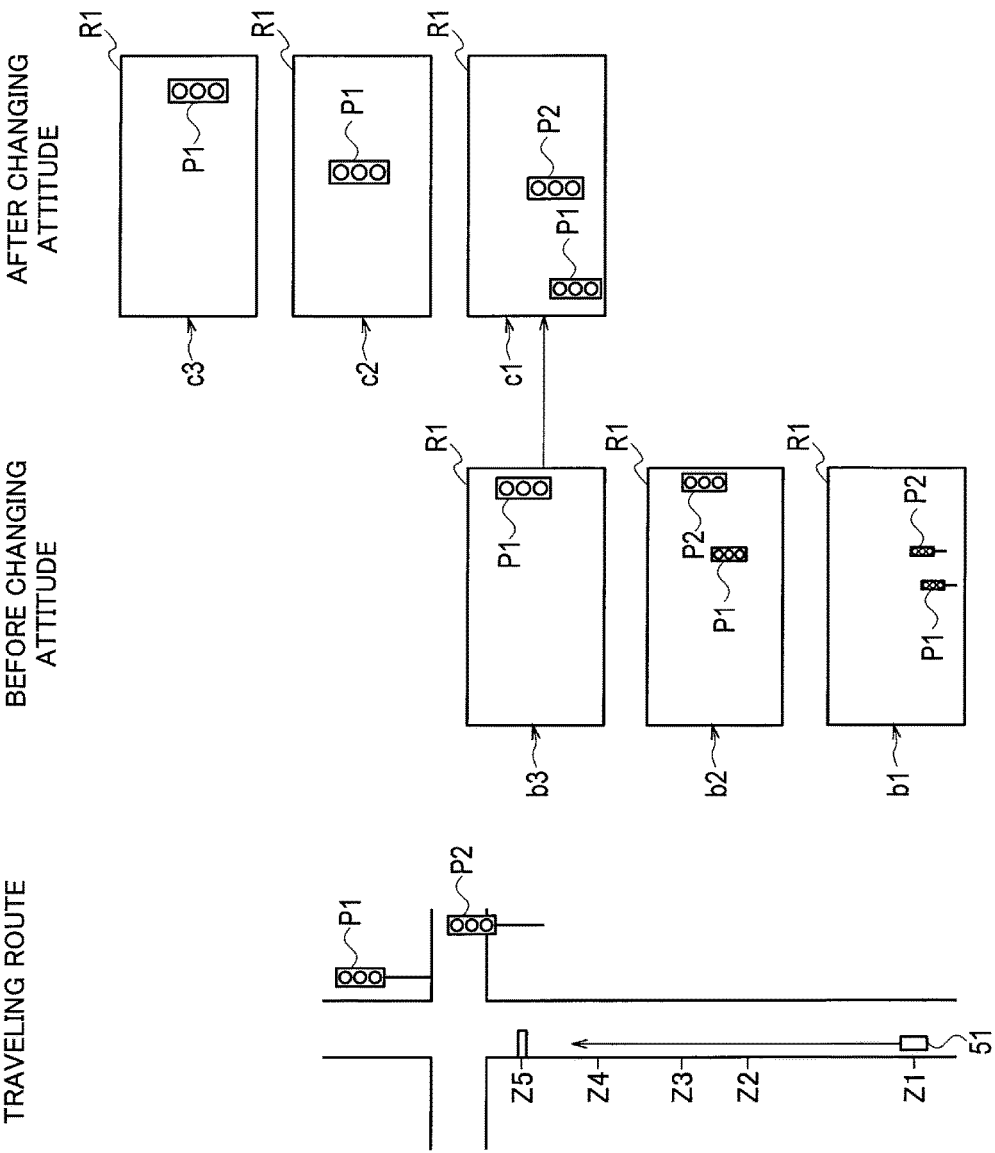

TRAFFIC LIGHT RECOGNITION DEVICE AND TRAFFIC LIGHT RECOGNITION METHOD

TECHNICAL FIELD

The present invention relates to a traffic light recognition device and a traffic light recognition method for recognizing a traffic light, the traffic light recognition device being mounted on a vehicle.

BACKGROUND

For example, a vehicle provided with an automatic operation function controls the operations to stop, travel, and so on by recognizing a traffic light provided along a traveling path of the vehicle and detecting a lighting state, such as lighting color, of the traffic light.

As a conventional traffic light recognition device, there is known, for example, the one disclosed in Japanese Patent Laid-Open Publication No. 11-306489. In Japanese Patent Laid-Open Publication No. 11-306489, a camera is mounted on a vehicle and images a traffic light ahead. In this case, the angle in the horizontal direction and the angle in the vertical direction of the camera are controlled so that the traffic light is located at the center of an image captured by the camera. Furthermore, the magnification is controlled so that the image of the traffic light has a desired size.

However, in the conventional example disclosed in Japanese Patent Laid-Open Publication No. 11-306489, a blur occurs in the image captured by a camera while changing the imaging direction of the camera, thus making the image recognition difficult. As the result, while changing the imaging direction of the camera the accuracy to detect the lighting state of a traffic light might decrease.

SUMMARY

The present invention has been made in order to solve the above-described conventional problems, and an object thereof is to provide a traffic light recognition device capable of eliminating the need to change the imaging direction of an imaging unit or reducing the number of times of changing the imaging direction, when a vehicle approaches a traffic light.

A traffic light recognition device according to an aspect of the present invention includes: an imaging unit; a map information acquisition unit configured to acquire map information; a vehicle current position detector configured to detect a current position on a map of a vehicle; and a traffic light position estimator configured to estimate a position on an image of a traffic light. The traffic light recognition device further includes: an imaging direction setting unit configured to set an imaging direction of the imaging unit on a basis of a position on the image of the traffic light and of a moving direction in the future on the image of the traffic light; an imaging direction change unit configured to change the imaging direction of the imaging unit to an imaging direction set by the imaging direction setting unit; and a traffic light recognition unit configured to recognize the traffic light from an image captured in the imaging direction by the imaging unit.

A traffic light recognition method according to an aspect of the present invention includes the steps of: capturing, by an imaging unit, an image around a vehicle; acquiring map information around the vehicle; detecting a current position on a map of the vehicle; and estimating a position on the image of the traffic light on a basis of the vehicle current position and the map information. The traffic light recognition method further includes the steps of: setting an imaging direction of the imaging unit on a basis of a position on the image of the traffic light and of a moving direction in the future on the image of the traffic light; changing the imaging direction of the imaging unit to the imaging direction set by the imaging direction setting unit; and recognizing the traffic light from an image captured in the imaging direction by the imaging unit.

BRIEF DESCRIPTION OF THE DRAWINGS

FIG. 8(a) illustrates the traveling route of a vehicle, FIG. 8(b) illustrates an image before changing the imaging direction, and FIG. 8(c) illustrates an image after changing the imaging direction;

FIG. 11(a) illustrates the traveling route of a vehicle, FIG. 11(b) illustrates an image before changing the imaging direction, and FIG. 11(c) illustrates an image after changing the imaging direction;

FIGS. 13(a)-13(d) are explanatory views illustrating the timing for changing the imaging direction of a traffic light recognition device which does not employ the second embodiment, FIG. 13(a) illustrates the traveling route of a vehicle, FIG. 13(b) illustrates an image before changing the imaging direction, and FIGS. 13(c) and 13(d) illustrate an image after changing the imaging direction;

FIGS. 14(a)-14(c) are explanatory views illustrating the timing for changing the imaging direction of a traffic light recognition device according to a third embodiment, FIG.

14(a) illustrates the traveling route of a vehicle, FIG. 14(b) illustrates an image before changing the imaging direction, and FIG. 14(c) illustrates an image after changing the imaging direction;

FIGS. 15(a)-15(c) are explanatory views illustrating the timing for changing the imaging direction of a traffic light recognition device which does not employ the third embodiment, FIG. 15(a) illustrates the traveling route of a vehicle, FIG. 15(b) illustrates an image before changing the imaging direction, and FIG. 15(c) illustrates an image after changing the imaging direction;

FIGS. 16(a)-16(c) are explanatory views illustrating the timing for changing the imaging direction of a traffic light recognition device according to a modified example of the third embodiment, FIG. 16(a) illustrates the traveling route of a vehicle, FIG. 16(b) illustrates an image before changing the imaging direction, and FIG. 16(c) illustrates an image after changing the imaging direction;

FIGS. 17(a)-17(e) are explanatory views illustrating the timing for changing the imaging direction of a traffic light recognition device according to a fourth embodiment, FIG. 17(a) illustrates the traveling route of a vehicle, FIG. 17(b) illustrates an image before changing the imaging direction, and FIGS. 17(c), 17(d) and 17(e) illustrate an image after changing the imaging direction; and FIGS. 18(a)-18(c) are explanatory views illustrating the timing for changing the imaging direction of a traffic light recognition device according to a fifth embodiment, FIG. 18(a) illustrates the traveling route of a vehicle, FIG. 18(b) illustrates an image before changing the imaging direction, and FIG. 18(c) illustrates an image after changing the imaging direction.

BRIEF DESCRIPTION OF THE EMBODIMENTS

Hereinafter, embodiments of the present invention will be explained with reference to the drawings.

[Explanation of First Embodiment]

Figure 1:
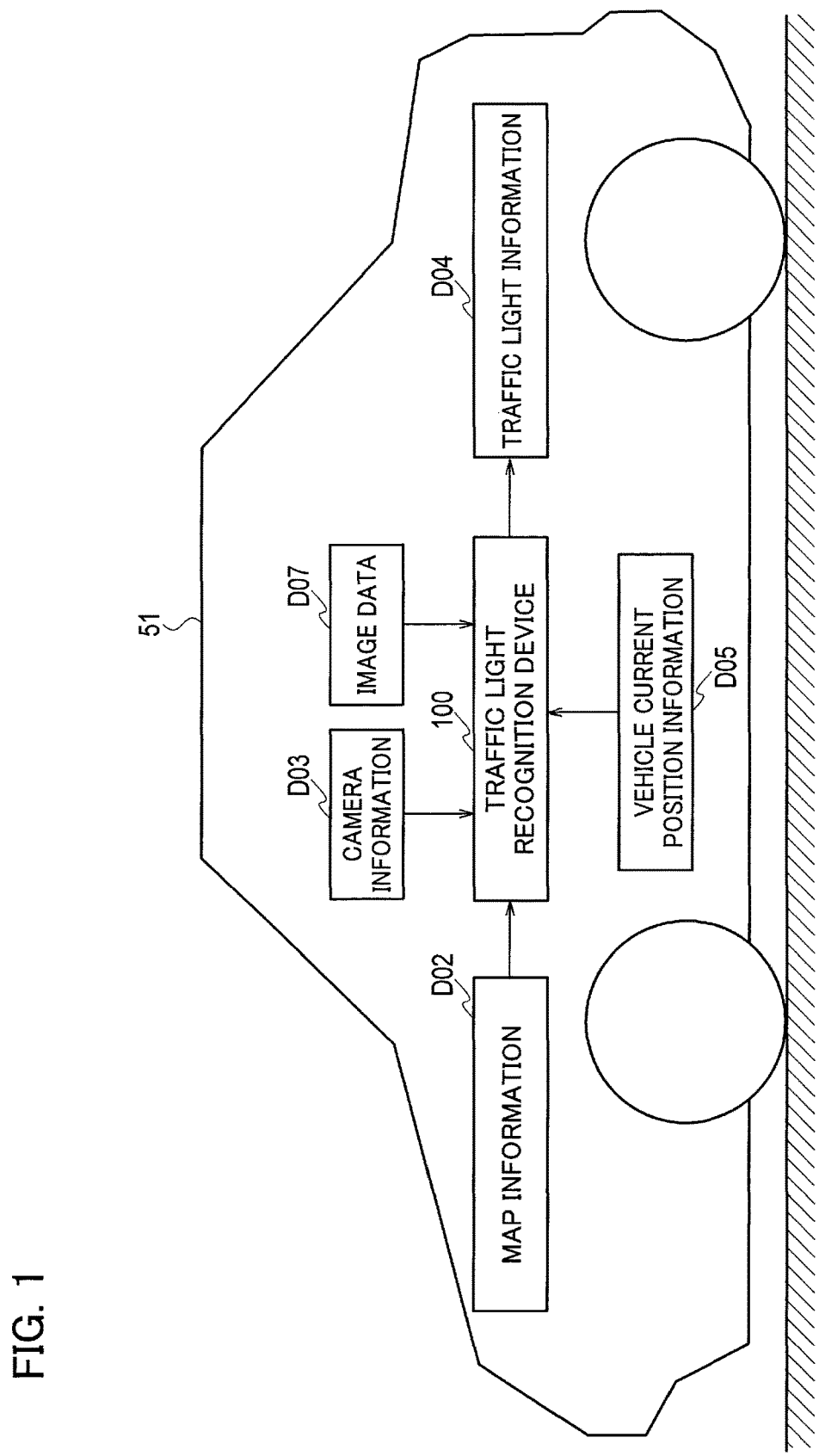
FIG. 1 is a block diagram illustrating a configuration of a traffic light recognition device according to an embodiment of the present invention and of the peripheral devices thereof.
Figure 2:
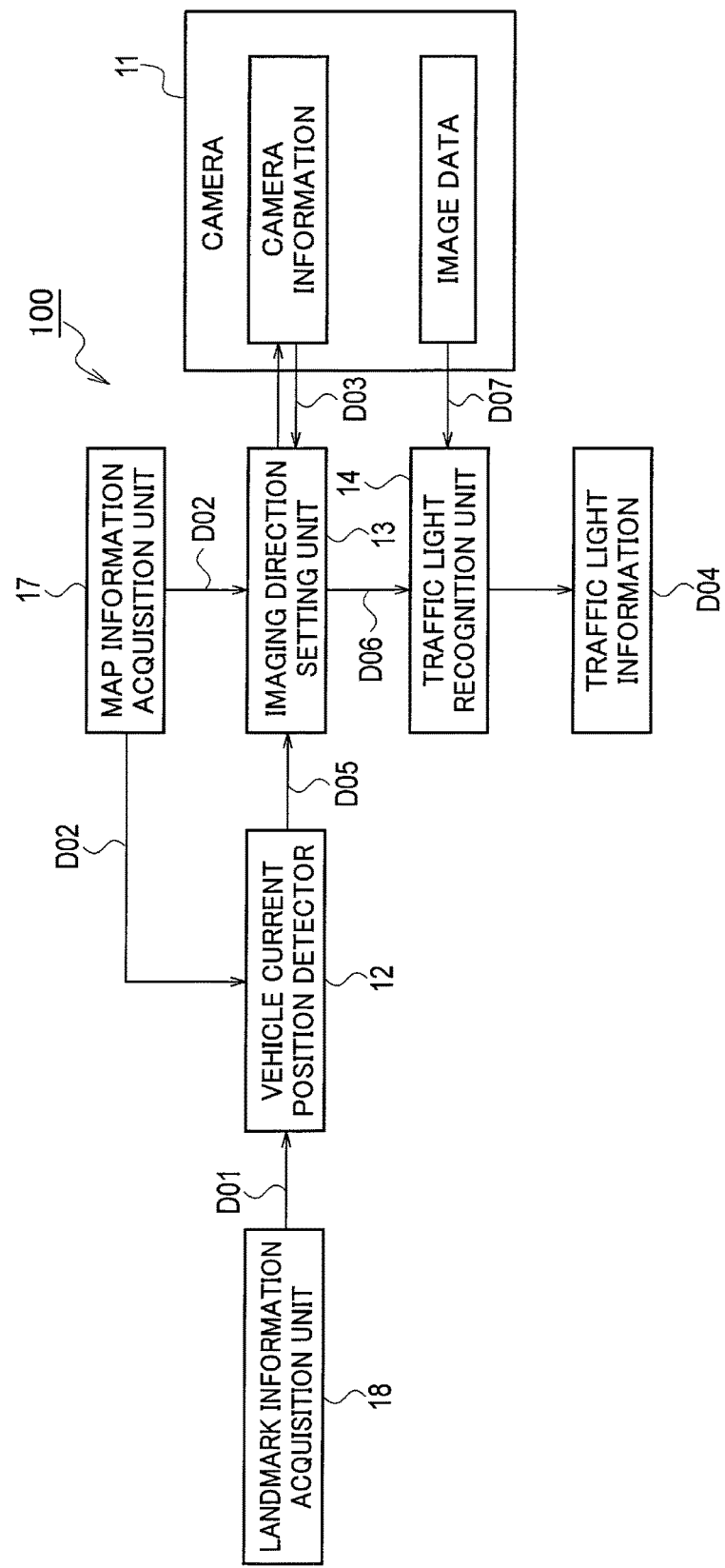
FIG. 2 is a block diagram illustrating the detailed configuration of the traffic light recognition device according to an embodiment of the present invention.

FIG. 1 is a block diagram illustrating a configuration of a traffic light recognition device according to a first embodiment of the present invention and of the peripheral devices thereof. Further, FIG. 2 is a block diagram illustrating the detail of a traffic light recognition device 100 illustrated in FIG. 1. As illustrated in FIG. 1, the traffic light recognition device 100 is mounted on a vehicle 51, and receives inputs of map information D02, camera information D03, vehicle current position information D05, and image data D07 from various devices mounted on this vehicle 51. Then, the traffic light recognition device 100 outputs traffic light information D04, which is the information recognized by this traffic light recognition device 100, to an apparatus at the subsequent stage.

The camera information D03 is the information about the installation position of a camera 11 (see FIG. 2) relative to the vehicle 51. Upon acquisition of three dimensional (3D) information indicative of the directions on a map of the vehicle 51, an imaging area around the vehicle can be estimated by the camera 11 on the basis of the camera information D03.

The map information D02 is the information provided from a map data base including the map data (map information around a vehicle) of a traveling path on which a vehicle travels, and includes the position information about a target, such as a ground landmark present along the traveling path, the position information about a traffic light, and the like.

As illustrated in FIG. 2, the traffic light recognition device 100 includes the camera 11 (imaging unit), a vehicle current position detector 12, a map information acquisition unit 17, an imaging direction setting unit 13, a traffic light recognition unit 14, and a landmark information acquisition unit 18.

The camera 11 is a camera provided with a solid state image sensor, such as a CCD or a CMOS, for example, and is installed on the vehicle 51 and captures an image around a traveling path to acquire a digital image of a peripheral area. The camera 11 outputs the captured image as the image data D07 to the traffic light recognition unit 14. Moreover, the camera 11 has stored therein the information about the installation position of the camera 11 relative to the vehicle 51, and outputs this information as the camera information D03 to the imaging direction setting unit 13. For the information about the installation position of the camera 11, for example a mark or the like for calibration is installed at a position known to the vehicle 51, so that the installation position can be calculated from a position on an image captured by the camera 11. Furthermore, the camera 11 is installed via a mechanism which is rotatable in the pan and tilt directions relative to the vehicle 51, includes a driving mechanism for driving the rotation angles in the pan and tilt directions, and can control the attitude of the camera 11 so that the camera 11 faces in a desired imaging direction by driving the rotation angles in the pan and tilt directions.

The map information acquisition unit 17 acquires the position information about a target, such as a ground landmark, present around a traveling path, the position information about a traffic light, and the like from a map data base including the map information (map information around a vehicle) about the traveling path on which a vehicle travels. The map information acquisition unit 17 outputs this map information as the map information D02 to the vehicle current position detector 12 and imaging direction setting unit 13.

The landmark information acquisition unit 18 is, for example, a sensing camera, laser radar, or the like mounted on a vehicle, and recognizes ground landmarks (road marks (lane marks, stop lines, texts), a curbstone, a traffic light, a sign, etc.) to acquire the information about the relative position relative to the vehicle 51. The landmark information acquisition unit 18 outputs the acquired information as landmark information D01 to the vehicle current position detector 12.

The vehicle current position detector 12 acquires the landmark information D01 and map information D02, detects a current position on a map of the vehicle 51 on the basis of these pieces of information, and outputs this as the vehicle current position information D05. As previously described, the landmark information D01 includes the information indicative of the relative positional relationship of a ground landmark relative to the vehicle 51. Accordingly, a current position on the map of the vehicle 51 can be detected by collating the position information about this landmark information D01 with the position information about a ground landmark included in the map information D02. Here, "position" includes a coordinate and an attitude. Specifically, the position of a ground landmark includes the coordinate and attitude thereof, and the position of the vehicle 51 includes the coordinate and attitude thereof. The vehicle current position detector 12 outputs, as the vehicle current position information D05, a coordinate (x, y, z) in a coordinate system serving as a reference and an attitude (yaw, pitch, roll) which is in the rotation direction in each coordinate axis.

The imaging direction setting unit 13 controls, on the basis of the vehicle current position information D05 and the map information D02, the attitude in the imaging direction of the camera 11 so that a traffic light present along a traveling path of the vehicle 51 is located within the imaging area of the camera 11. Specifically, the attitude of the camera 11 can be controlled by driving the rotation angles in the pan and tilt directions of the camera 11 so as to be in a target imaging direction. Then, from an image captured in this imaging direction, a detection area, in which a traffic light is assumed to be present, is set and output as detection area information D06. That is, once the attitude of the camera 11 is determined and the area to be imaged is set, a position at which a traffic light is assumed to be present on an image captured by the camera 11 can be identified. Therefore, an area including this position can be set as the detection area. This detection area information D06 is output to the traffic light recognition unit 14. In this case, a detection area is set so as to have such a size that each traffic light will not frame out from within the detection area even when an error occurs in the vehicle behavior and/or vehicle current position information. The imaging direction setting unit 13 is provided with a function to determine the imaging direction of the camera 11 on the basis of the position of the vehicle 51, the position of a traffic light, and a change amount of the position of a traffic light. The detail of the imaging direction setting unit 13 will be described later with reference to FIG. 3.

The traffic light recognition unit 14 recognizes a traffic light on the basis of the above-described detection area information D06 from the image data D07 captured by the camera 11. Specifically, on the basis of the image data D07 output from the camera 11 and the detection area information D06 set by the imaging direction setting unit 13, image processing for recognizing a traffic light is performed on a detection area. As the method for image processing, a signaling lamp of a traffic light can be detected using, for example, a method for detecting a signaling lamp of a traffic light by using a blinking light in synchronization with the alternating current (AC) cycle of a commercial power supply or a method for determining similarity between the characteristics, such as the hues and round shapes of red, green, and yellow lamps, or the like. Other than these methods, a known image processing for detecting a traffic light can be applied. Recognition processing of a traffic light is performed not on the whole image data D07 captured by the camera 11 but on a detection area set as a part thereof, so that the load in the information processing for detecting a traffic light can be reduced and a traffic light can be detected quickly. Then, the traffic light recognition unit 14 outputs the recognition result of a traffic light as the traffic light information D04. Note that the recognition processing of a traffic light is not limited to the above-described method, and the other methods can also be employed.

Figure 3:
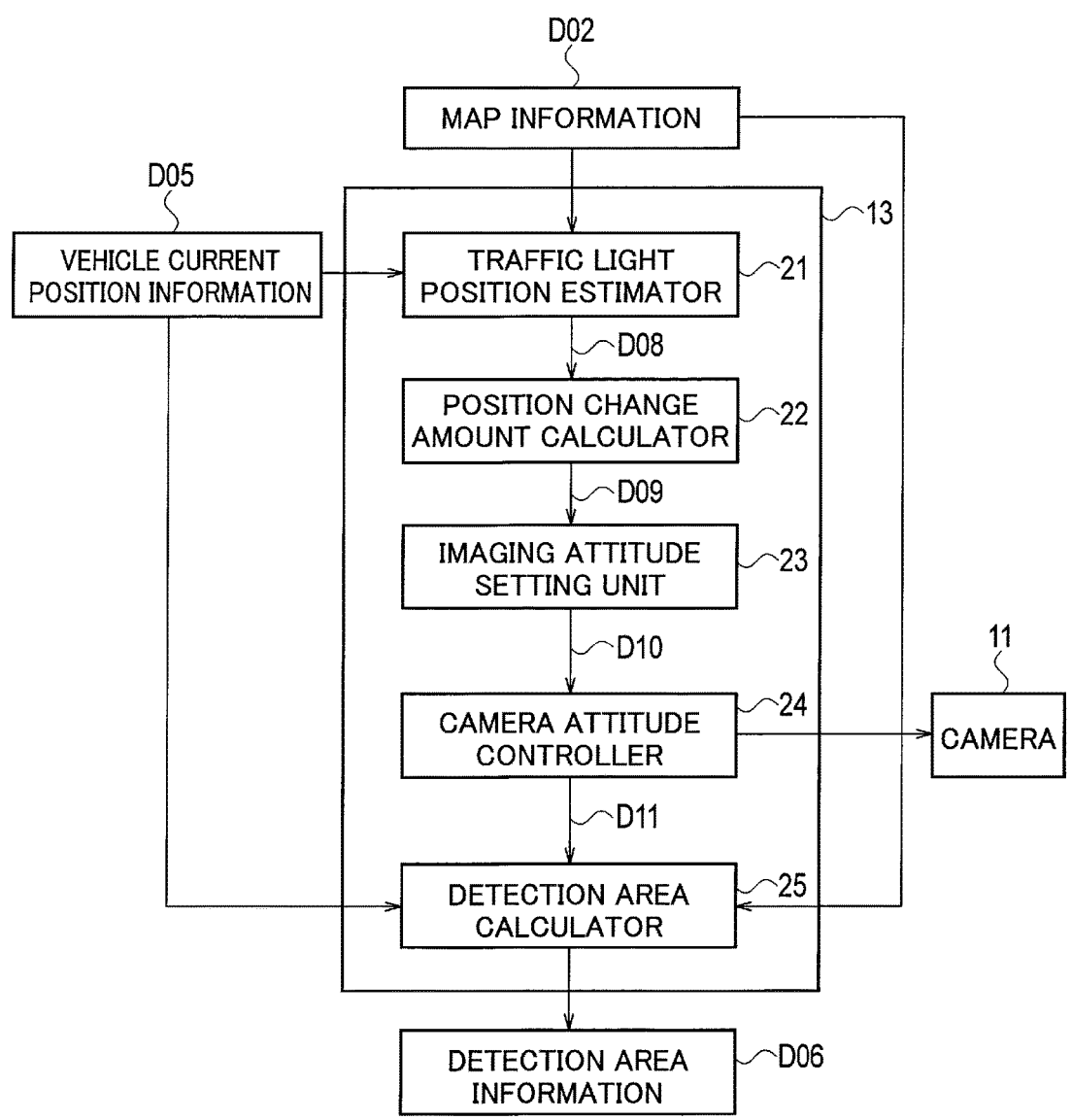
FIG. 3 is a block diagram illustrating the detailed configuration of an imaging attitude setting unit according to a first embodiment.

FIG. 3 is a block diagram illustrating the detailed configuration of the imaging direction setting unit 13. As illustrated in FIG. 3, the imaging direction setting unit 13 includes a traffic light position estimator 21, a position change amount calculator 22, an imaging attitude setting unit 23, a camera attitude controller 24, and a detection area calculator 25.

Figure 5:
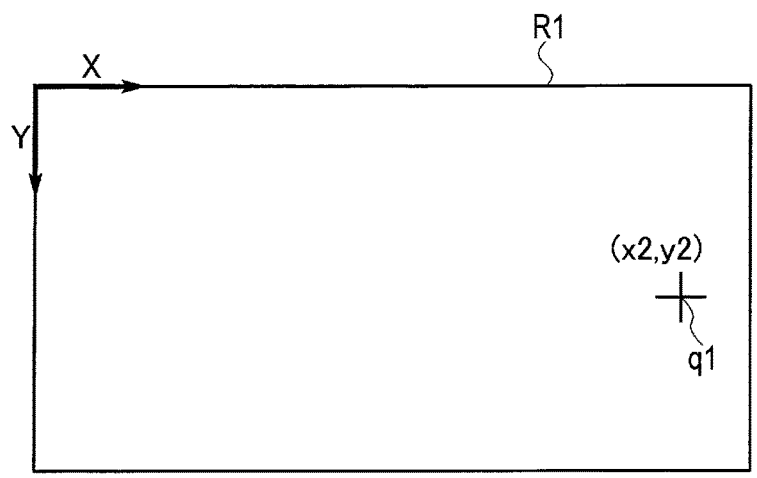
FIG. 5 is an explanatory view illustrating the current position coordinate of a traffic light present in an image.

The traffic light position estimator 21 receives inputs of the map information D02 and vehicle current position information D05 and outputs detection position information D08. Since the map information D02 includes the coordinate of each traffic light, the traffic light position estimator 21 can obtain the relative coordinate of a traffic light relative to the vehicle 51 on the basis of the coordinate of each traffic light, the coordinate of the vehicle 51, and the attitude of the camera 11. Accordingly, once the attitude when the camera 11 images a periphery is determined, a position on an image can be identified at which position a traffic light on a captured image would be imaged. For example, as illustrated in FIG. 5, within an image R1 an estimated position (x2, y2) of a traffic light can be set. That is, the traffic light position estimator 21 is provided with a function to estimate the position of a traffic light on the basis of the map information around the vehicle 51.

Figure 6:
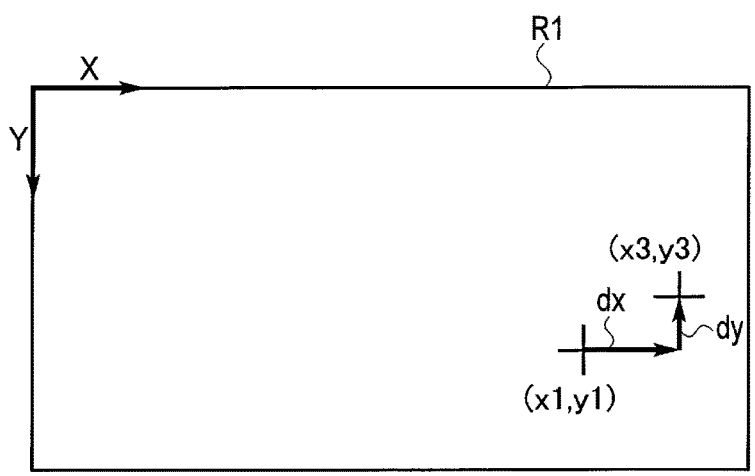
FIG. 6 is an explanatory view illustrating the past position coordinate and current position coordinate of the traffic light present in the image.

The position change amount calculator 22 calculates a change amount of the position of a traffic light within the image R1. That is, as illustrated in FIG. 6, within the image R1, a past detection position coordinate (x1, y1) and a current detection position coordinate (x3, y3) are acquired to calculate a position change amount on the image of a traffic light. Then, the calculated position change amount on the image of the traffic light is output as detection position change information D09. Specifically, a difference in the x-coordinate (x3−x1)=dx and a difference in the y-coordinate (y3−y1)=dy are calculated to obtain change amount (dx, dy). In this case, provided that the attitude of the camera 11 is set to the same between at past detection and at current detection. Moreover, as the past detection position coordinate, the coordinate one detection cycle earlier can be used. Alternatively, the coordinate two or more cycles earlier may also be used if noise would not be superimposed. That is, the position change amount calculator 22 is provided with a function to calculate a change amount with the lapse of time of the position of a traffic light estimated by the traffic light position estimator 21.

The imaging attitude setting unit 23 refers to the above-described change amount (dx, dy) and estimates the moving direction of a traffic light within the image R1 from this change amount. Then, on the basis of the estimated moving direction, the imaging direction of the camera 11 is determined so that a traffic light will not frame out from within the image R1. Specifically, the change direction of a traffic light within the image R1 is obtained from the above-described change amount (dx, dy), and the imaging direction of the camera 11 is determined so that a traffic light is located in place within the image R1 on the opposite direction side of this change direction. That is, the imaging attitude setting unit 23 is provided with a function, as the imaging direction setting unit, to determine the imaging direction of the camera 11 on the basis of the position of the vehicle 51, the position of a traffic light estimated by the traffic light position estimator 21, and a change amount of the position of a traffic light.

Figure 7:
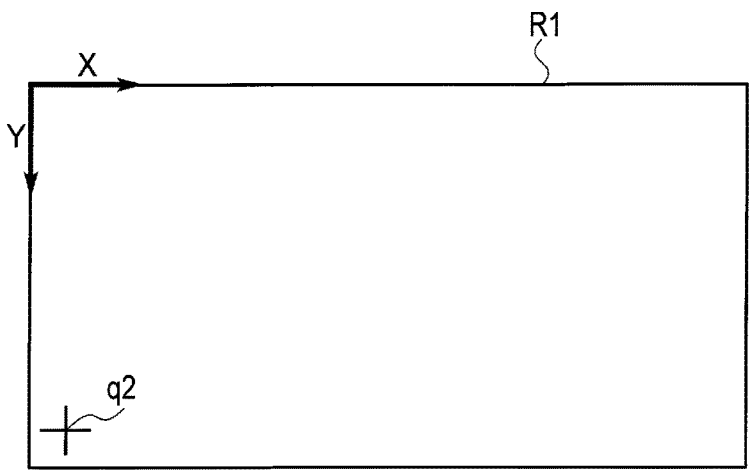
FIG. 7 is an explanatory view illustrating how the position coordinate of the traffic light has moved in the lower left of an image by changing the imaging direction of a camera.

As illustrated in FIG. 5 described above, when a traffic light is present at the point of reference sign q1 on the right side within the image R1, and furthermore, the moving direction of this traffic light is the upper-right direction as illustrated in FIG. 6, i.e., when dx is a positive value (dx>0) and dy is a negative value (dy<0), a traffic light within the image R1 is estimated to move in the upper-right direction. Accordingly, as illustrated in FIG. 7, the imaging direction of the camera 11 is determined so that a traffic light is located at the position of lower-left reference sign q2 within the image R1. Here, even in such a case, when it is determined that the estimated position (x2, y2) is present at a position where a traffic light will not frame out even assuming a case where an error occurs in the vehicle behavior and/or vehicle current position information until a vehicle passes through the point of a traffic light, the current state will be maintained without changing the imaging direction of the camera 11.

The camera attitude controller 24 controls, on the basis of imaging attitude information D10 output from the imaging attitude setting unit 23, the attitude in the imaging direction of the camera 11 so that the traffic light will not frame out from within the image R1. Specifically, the attitude of the camera 11 can be controlled by driving the rotation angles in the pan and tilt directions of the camera 11 so as to be in a target imaging direction. Then, attitude information D11 of the camera 11 set by the attitude control is output. Moreover, when the imaging attitude information D10 will not change between at the current calculation and at the calculation one-cycle earlier, the current imaging direction will be maintained without changing the imaging direction of the camera 11. The camera attitude controller 24 is provided with a function, as the imaging direction change unit, to change the imaging direction so that the imaging direction of the camera 11 becomes an imaging direction set by the imaging attitude setting unit 23.

The detection area calculator 25 sets, on the basis of the above-described attitude information D11 of the camera 11, map information D02, and vehicle current position information D05, a detection area for detecting a traffic light from the image R1 captured by the camera 11. The position of a traffic light is registered, as a coordinate on a map, with the map information D02 in advance. On the basis of the coordinate of the position of a traffic light on a map and of the coordinate of the current position and attitude of the vehicle 51 on the map, the relative position of the traffic light relative to the vehicle 51 can be obtained. Then, on the basis of this relative position and the attitude information D11 about the camera 11 relative to the vehicle 51, the position of a traffic light on the image of the image R1 captured by the camera 11 is obtained, and furthermore, on the basis of the position of the traffic light on this image, a detection area is set within the image R1. The detection area is set so as to have such a size that the traffic light will not frame out even when an error occurs in the vehicle behavior and/or vehicle current position information. Then, the set detection area information D06 is output. This detection area information D06 is output to the traffic light recognition unit 14 as illustrated in FIG. 2.

Note that, the vehicle current position detector 12, imaging direction setting unit 13, and traffic light recognition unit 14 described above can be realized using a microcontroller provided with a CPU, a memory, and an input/output unit. Specifically, the CPU constitutes a plurality of information processing units (12, 13, 14) of the microcontroller by executing a pre-installed computer program. A part of the memory of the microcontroller constitutes a map data base for storing the map information D02. Note that the microcontroller may also be used as an ECU used for other controls (e.g., automatic operation control) related to a vehicle.

Figure 4:
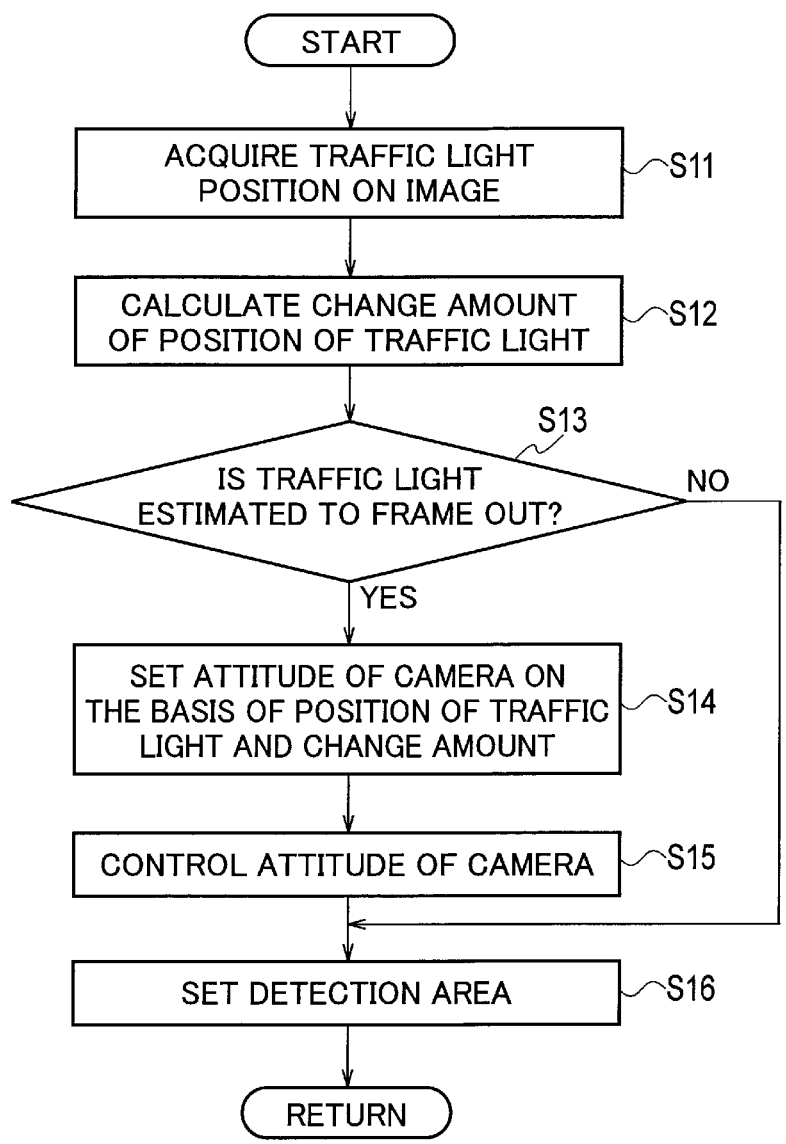
FIG. 4 is a flow chart illustrating a processing procedure of a traffic light recognition device according to the first embodiment.

Next, the action of the traffic light recognition device 100 according to the above-described first embodiment will be explained with reference to the flow chart illustrated in FIG. 4. First, in step S11, the traffic light position estimator 21 illustrated in FIG. 3 calculates, on the basis of the map information D02 and vehicle current position information D05, the position of a traffic light within the image R1 captured by the camera 11. Specifically, the position of reference sign q1 illustrated in FIG. 5 is calculated. This processing is executed at a predetermined calculation cycle.

In step S12, the position change amount calculator 22 calculates a change amount of the position of a traffic light within the image R1. As illustrated in FIG. 6, when the position coordinate of a traffic light moves to (x3, y3) from (x1, y1), the change amount (dx, dy) in this case is calculated.

In step S13, the imaging attitude setting unit 23 estimates whether or not the traffic light within the image R1 will frame out from this image R1. In this processing, as illustrated in FIG. 6, on the basis of the estimated-position coordinate (x2, y2) of the traffic light and the change amount (dx, dy), the imaging attitude setting unit 23 estimates whether or not the traffic light will frame out from the image R1.

Then, when the traffic light is estimated to frame out (YES in step S13), in step S14, the camera attitude controller 24 sets the imaging direction of the camera 11 to perform attitude control so that the traffic light will not frame out from the image R1 or so that the number of times of changing the imaging direction falls within the minimum even if the traffic light will inevitably frame out. For example, as illustrated in FIG. 6, when the traffic light within the image R1 is estimated to be present at the coordinate (x2, y2) and this traffic light is moving to the upper right direction, the traffic light is predicted to frame out from the image R1 if nothing is done. Accordingly, as illustrated in FIG. 7, the imaging direction of the camera 11 is set so that the traffic light will be located at the position of reference sign q2 illustrated on the lower left within the image R1. In step S15, the camera attitude controller 24 controls the attitude of the camera 11 so as to be in the set imaging direction.

On the other hand, when the traffic light is estimated not to frame out (NO in step S13), the processing procedure proceeds to step S16. Subsequently, in step S16, the detection area calculator 25 sets a detection area for detecting the traffic light from the image R1 captured by the camera 11. As the result, when the vehicle 51 approaches an intersection where the traffic light is installed, framing-out of this traffic light from the image R1 can be avoided.

Figure 8:
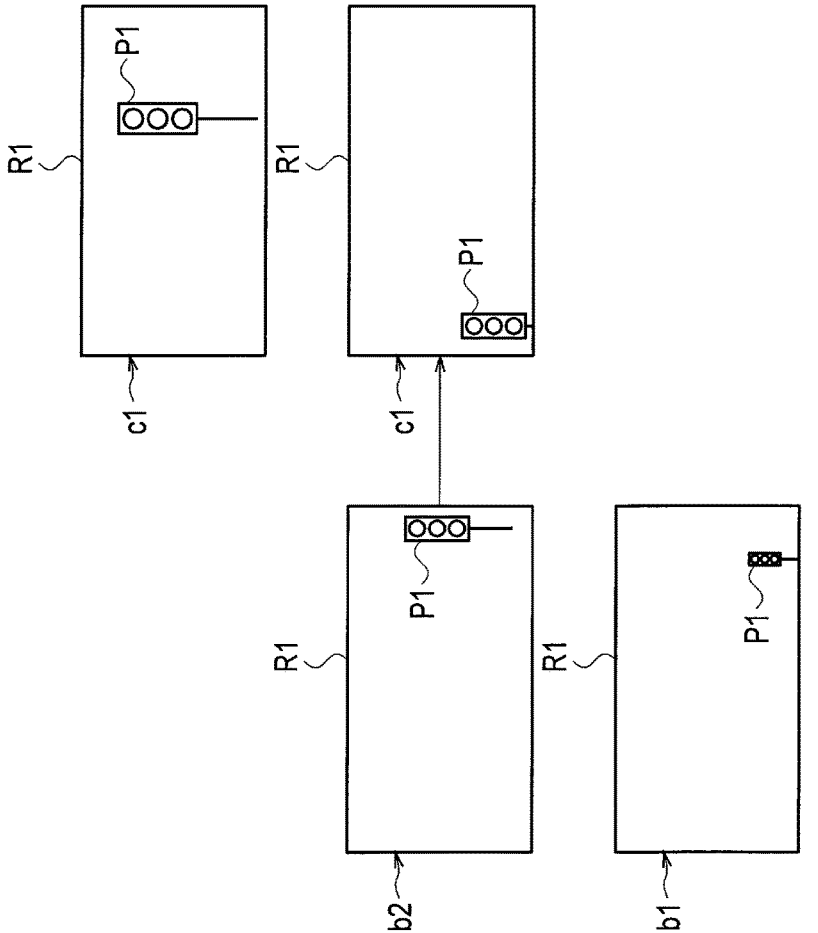
FIGS. 8(a)-8(c) are explanatory views illustrating the timing for changing the imaging direction of the traffic light recognition device according to the first embodiment.

Next, a change of the position of a traffic light within the image R1 when the vehicle 51 approaches the traffic light will be explained. FIGS. 8(a)-8(c) are explanatory views schematically illustrating how the vehicle 51 travels on a linear traveling path X1 and is approaching a traffic light P1. FIG. 8(a) illustrates the positional relationship between the vehicle and the traffic light P1, FIG. 8(b) illustrates the image R1 before changing the imaging direction of the camera 11, and FIG. 8(c) illustrates the image R1 after changing the imaging direction of the camera 11.

A point Z1 illustrated in FIG. 8(a) is the point where the vehicle 51 is sufficiently away from the traffic light P1 and the traffic light P1 can be confirmed from the image captured by the camera 11. Moreover, a point Z2 is the point where the vehicle 51 has approached the traffic light P1. A point Z3 is the point where a stop line is already set. Accordingly, the area from the point Z2 to point Z3 is the area where the vehicle 51 is to brake, i.e., the area for the vehicle 51 to brake so as to stop by decelerating the vehicle 51 when it is determined whether to stop or travel and it has been determined to stop. Therefore, the area indicated by the point Z2 to point Z3 is the area where a change in the lighting state of the traffic light P1 needs to be accurately recognized.

As illustrated in FIG. 8(a), when the vehicle 51 is traveling at the point Z1, the traffic light P1 is present on the lower right within the image R1 captured by the camera 11 as indicated by reference sign b1 of FIG. 8(b).

Subsequently, once the vehicle 51 reaches the point Z2, the traffic light P1 moves in the upper-right direction within the image R1 as indicated by reference sign b2. In this case, the traffic light P1 is displayed larger as the vehicle 51 approaches. Accordingly, the traffic light P1 will frame out from the image R1 if nothing is done.

In this embodiment, at the time point when the vehicle 51 reaches the point Z2 on the traveling path, the imaging direction of the camera 11 is changed. Specifically, the imaging area of the camera 11 is caused to move in the upper-right direction. Thus, the traffic light P1 will move to the lower left within the image R1 as indicated by reference sign c1 of FIG. 8(c). Accordingly, at the time point when the vehicle 51 further proceeds and reaches the point Z3, the traffic light P1 is reliably displayed without framing out from the image R1 as indicated by reference sign c2. That is, the traffic light P1 can be retained within the image R1 without changing the imaging direction of the camera 11 in the area from the point Z2 to point Z3 where the lighting state of the traffic light P1 needs to be accurately recognized. Then, setting a detection area within this image R1 allows for accurate recognition of a traffic light.

In this manner, in the traffic light recognition device 100 according to the first embodiment, in detecting the traffic light P1 present within the image R1 captured by the camera 11 it is estimated, on the basis of the moving direction of the traffic light P1 within the image R1, whether or not this traffic light P1 will frame out. Then, when this traffic light P1 is estimated to frame out, the imaging direction of the camera 11 is changed in advance so that the position of the traffic light P1 within the image R1 becomes a position at which the traffic light P1 will not frame out.

Accordingly, after the vehicle 51 approaches the traffic light P1 illustrated in FIG. 8(a) and reaches the point Z2, framing-out of the traffic light P1 from the image R1 can be avoided without performing the attitude control in the imaging direction of the camera 11. That is, in the area from the point Z2 to point Z3 which is the most important area in detecting the lighting state of the traffic light P1, the need to change the imaging direction of the camera 11 is eliminated or the number of times of changing the imaging direction is reduced, so the occurrence of a blur in the image captured by the camera 11 can be avoided. Accordingly, a lighting state of the traffic light P1 can be reliably detected to contribute to automatic operation and the like.

Moreover, since the imaging direction setting unit 13 calculates a change amount in the imaging direction from the position on the image of a traffic light and a moving range in the future on the image of the traffic light and sets the imaging direction on the basis of the imaging range of the camera 11 and the change amount in the imaging direction, framing-out of the traffic light P1 from the image R1 can be reliably avoided.

[Explanation of Modified Example of First Embodiment]

Next, a modified example of the traffic light recognition device 100 according to the first embodiment will be explained. The first embodiment described above is configured that on the basis of the vehicle current position information D05 of a vehicle and the map information D02 (see FIG. 3), the position of the traffic light P1 present within the image R1 is estimated, and on the basis of this moving direction of the traffic light P1, the attitude control in the imaging direction of the camera 11 is performed.

In contrast, in a traffic light recognition device according to the modified example, the traffic light position estimator 21 illustrated in FIG. 3 actually subjects an image within the image R1 to image processing, to thereby recognize the position of the traffic light P1. Then, the position change amount calculator 22 detects, by image processing, the position (x1, y1) of the traffic light P1 recognized in the past and the position (x2, y2) of the traffic light P1 recognized at present, and obtains the detection position change information D09 from the detected position information.

As explained above, in the traffic light recognition device according to the modified example, the traffic light P1 present within an image within the image R1 is recognized by image processing, and the attitude control in the imaging direction of the camera 11 is performed on the basis of the moving direction of this traffic light P1, so more accurate attitude control in the imaging direction of the camera 11 is enabled.

[Explanation of Second Embodiment]

Next, a second embodiment of the present invention will be explained. The whole configuration of a traffic light recognition device according to the second embodiment is the same as the one described in FIG. 1, but differs in the configuration of the imaging direction setting unit 13. Hereinafter, the configuration of the imaging direction setting unit 13 according to the second embodiment will be explained with reference to the block diagram illustrated in FIG. 9.

Figure 9:
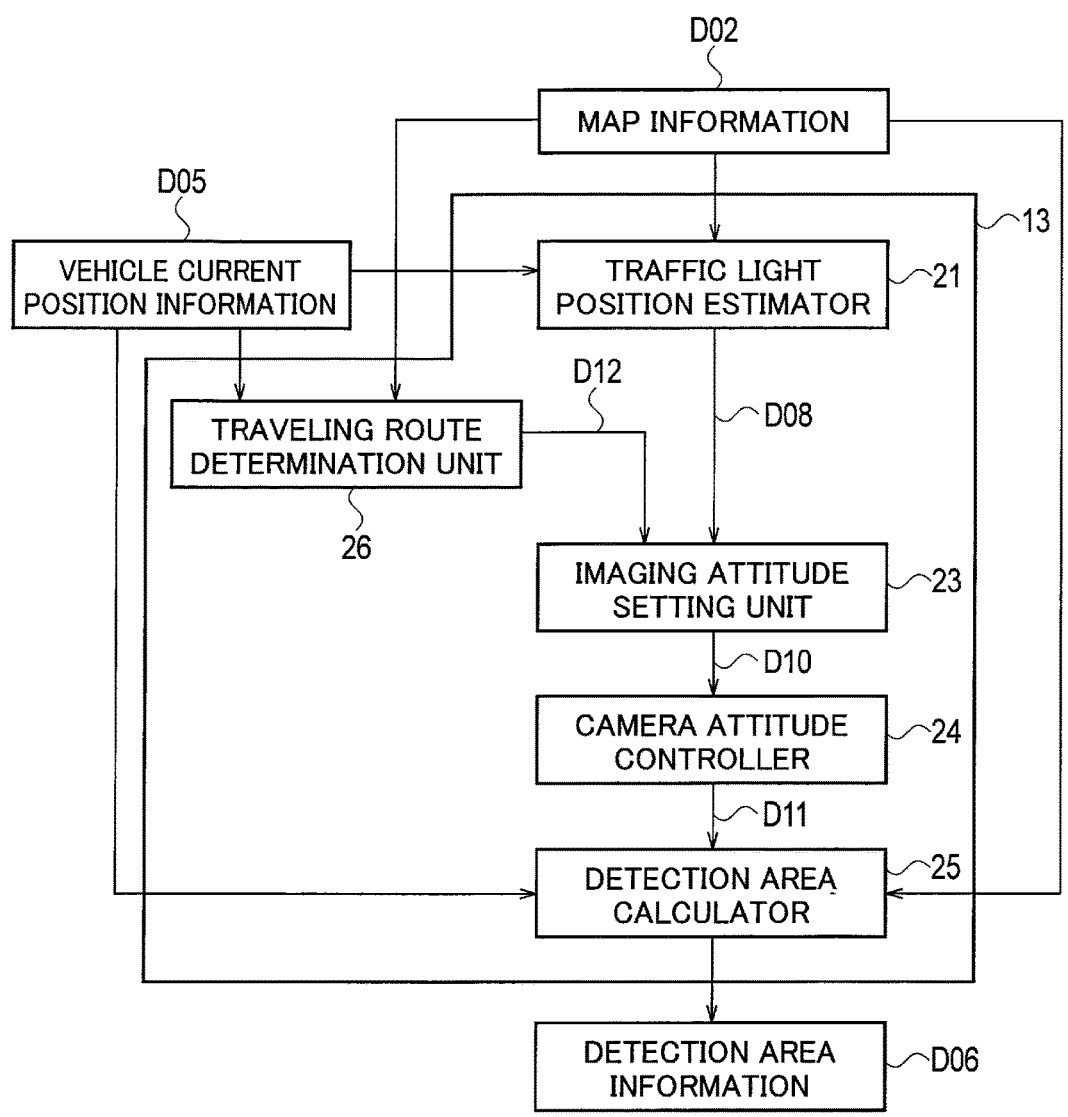
FIG. 9 is a block diagram illustrating the detailed configuration of an imaging attitude setting unit according to a second embodiment.

As illustrated in FIG. 9, the imaging direction setting unit 13 includes a traveling route determination unit 26, the traffic light position estimator 21, the imaging attitude setting unit 23, the camera attitude controller 24, and the detection area calculator 25. The second embodiment differs from the above-described first embodiment in that the "traveling route determination unit 26" is provided instead of the "position change amount calculator 22" illustrated in FIG. 3. The same component as that of FIG. 3 is given the same reference sign to omit the explanation of the configuration thereof.

The traveling route determination unit 26 receives inputs of the map information D02 and the vehicle current position information D05, and obtains, using these pieces of information, a route on which the vehicle 51 is to travel. For example, on the basis of the map information D02, the traveling path on which the vehicle 51 is currently traveling is detected, and furthermore at which position on this traveling path the vehicle 51 is traveling is detected from the vehicle current position information D05. Then, a route on which the vehicle 51 will travel hereinafter is estimated from this detection result, and is output as traveling route information D12. For example, when the vehicle 51 is traveling on the near side of a curve road and is estimated to subsequently enter this curve road (see the vehicle 51 in FIG. 11(a) described later), the information about the curving direction (the left or right direction) and curvature radius of this curve road are output as the traveling route information D12.

The imaging attitude setting unit 23 determines the imaging direction of the camera 11 on the basis of the traveling route information D12 and the detection position information D08 output from the traffic light position estimator 21. Specifically, the imaging attitude setting unit 23 predicts, in accordance with the traveling condition of the vehicle 51, a change in the imaging direction when the camera 11 images the traffic light P1, and determines the imaging direction of the camera 11 so that the traffic light P1 will not frame out from the image R1 even when a change occurs in the imaging direction.

Figure 10:
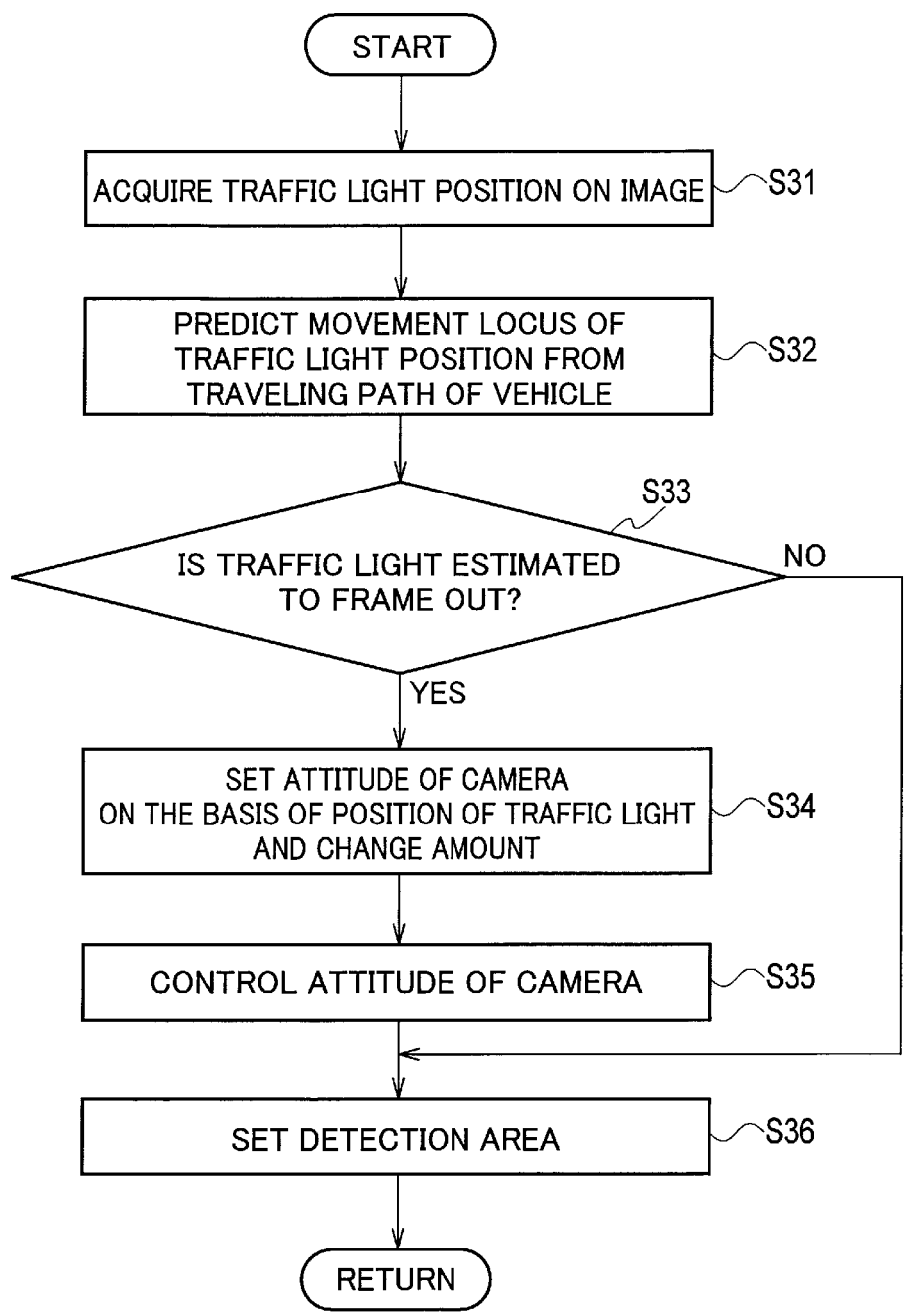
FIG. 10 is a flow chart illustrating a processing procedure of a traffic light recognition device according to the second embodiment.

Next, the action of the traffic light recognition device according to the second embodiment will be explained with reference to the flow chart illustrated in FIG. 10. First, in step S31, the traffic light position estimator 21 illustrated in FIG. 9 calculates the position of a traffic light within the image R1 captured by the camera 11, on the basis of the map information D02 and vehicle current position information D05. This processing is executed at a predetermined calculation cycle.

In step S32, the traveling route determination unit 26 acquires, from the map information D02, a route on which the vehicle 51 is estimated to travel in the future, and predicts, on the basis of the vehicle current position information D05 of the vehicle 51, the movement of a traffic light within the image R1.

In step S33, the imaging attitude setting unit 23 estimates whether or not the traffic light within the image R1 will frame out from this image R1. In this processing, on the basis of the conditions of the traveling route of the vehicle 51 the imaging attitude setting unit 23 estimates, from the information about the traveling direction of the vehicle 51 and the like when this vehicle 51 approaches an intersection where a traffic light is installed, whether or not the traffic light will frame out from the image.

If the traffic light is estimated to frame out (YES in step S33), then in step S34, the camera attitude controller 24 sets the imaging direction of the camera 11 to perform attitude control so that a traffic light will not frame out from the image R1 or so that the number of times of changing the imaging direction falls within the minimum even if the traffic light will inevitably frame out. The attitude control in the imaging direction of the camera 11 will be described later with reference to FIG. 11 to FIG. 13. In step S35, the camera attitude controller 24 controls the attitude in the imaging direction of the camera 11 so as to be in the set imaging direction. Subsequently, the processing procedure proceeds to step S36.

On the other hand, if the traffic light is estimated not to frame out (NO in step S33), the processing procedure proceeds to step S36. In step S36, the detection area calculator 25 sets a detection area for detecting a traffic light from the image R1 captured by the camera 11. With such setting, when the vehicle 51 approaches an intersection where a traffic light is installed, framing-out of this traffic light from within the image R1 can be avoided.

Figure 11:
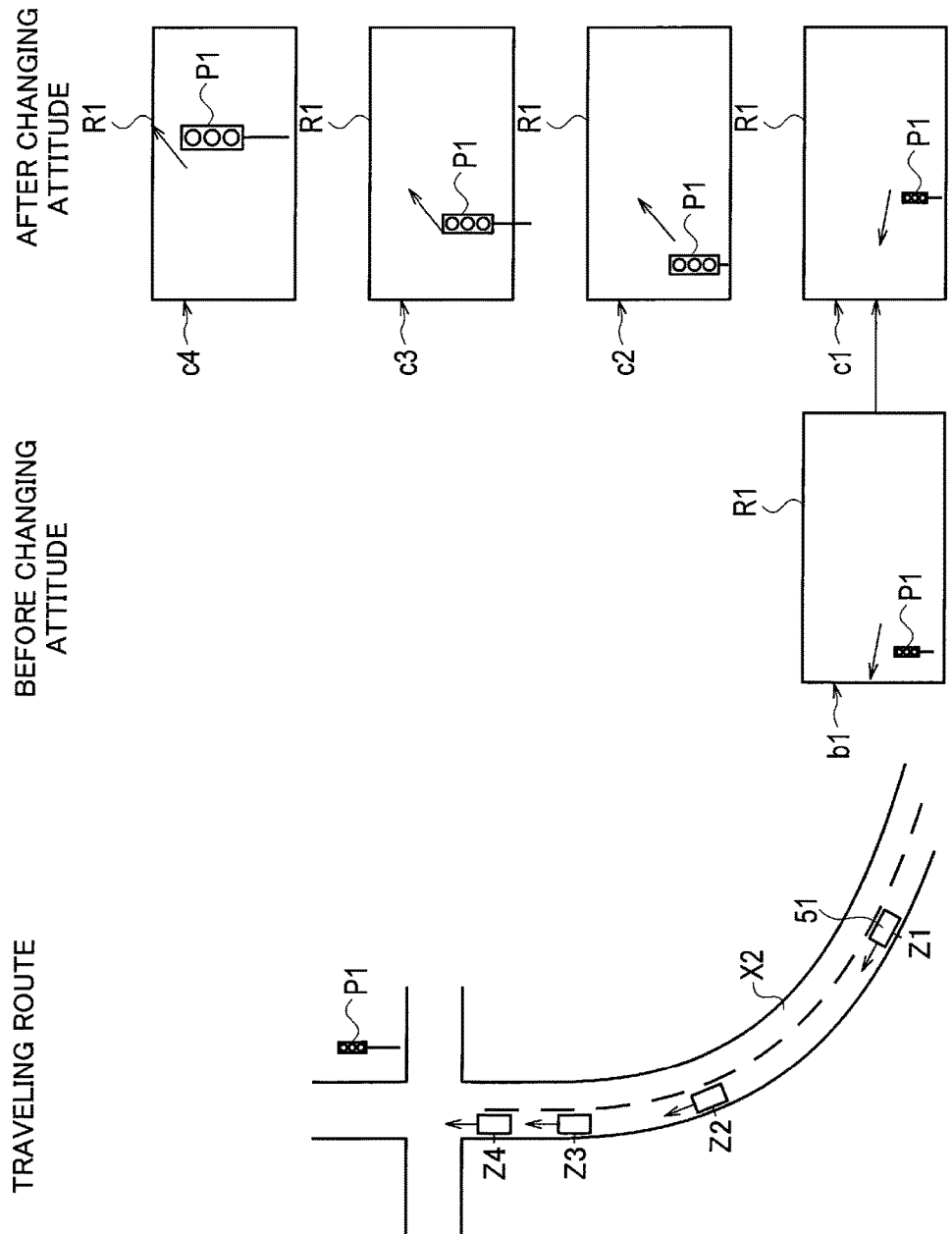
FIGS. 11(a)-11(c) are explanatory views illustrating the timing for changing the imaging direction of the traffic light recognition device according to the second embodiment.
Figure 12:
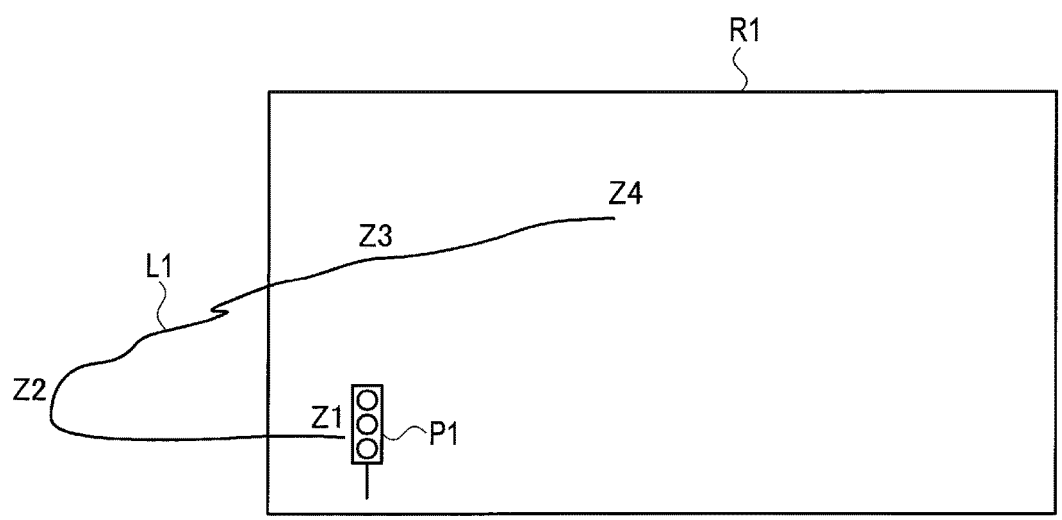
FIG. 12 is an explanatory view illustrating the movement locus of a traffic light on an image when a vehicle travels a curve road.

Next, the detail of the above-described processing in step S34 will be explained with reference to FIG. 11 to FIG. 13. For example, a case is taken as an example and explained where the vehicle 51 travels on a curve road X2 curving in the right direction and heads toward an intersection where the traffic light P1 is installed, as illustrated in FIG. 11(a). As illustrated in FIG. 11(a), the vehicle 51 proceeds toward points Z1, Z2, Z3, and Z4.

Now, assume that at the point Z1 illustrated in FIG. 11(a) the traffic light P1 is present on the lower left of the image R1 as indicated by reference sign b1 of FIG. 11(b). An enlarged view of this is illustrated in FIG. 12. Then, as the vehicle 51 travels on the curve road X2, the traffic light P1 will move like a curve L1 relative to the image R1 illustrated in FIG. 12. Note that Z1 to Z4 illustrated in FIG. 12 correspond to the points Z1 to Z4 illustrated in FIG. 11(a). Accordingly, unless the imaging direction of the camera 11 is changed to move the image R1, the traffic light P1 will frame out from the image R1.

The movement of the traffic light P1 following the movement locus indicated by the curve L1 within the image R1 is the information that can be acquired in advance from the map information D02 and the vehicle current position information D05 of the vehicle. Then, the camera attitude controller 24 estimates that the position of the traffic light P1 will change like the curve L1 illustrated in FIG. 12, and performs the attitude control in the imaging direction of the camera 11 so that the traffic light P1 will not frame out from the image R1 even when the change like the curve L1 occurs.

Specifically, when the traffic light is present on the lower left of the image R1 as indicated by the reference sign b1 of FIG. 11(b) at the time point when the vehicle 51 has reached the point Z1 illustrated in FIG. 11(a), the attitude control in the imaging direction of the camera 11 is performed so that the traffic light will be located on the slightly left side of the center of the image R1, as indicated by reference sign c1 of FIG. 11(c).

Then, when the vehicle 51 has reached the point Z2, the traffic light P1 is located at a left end of the image R1 as indicated by the reference sign c2. Furthermore, when the vehicle 51 has reached the points Z3 and Z4, the traffic light P1 is located within the image R1 as indicated by reference signs c3 and c4. That is, at the time point when the vehicle 51 has reached the point Z1, the movement of the traffic light within the image R1 is predicted on the basis of the traveling route in the future of the vehicle 51 and the vehicle current position information D05 of the vehicle 51, and on the basis of this prediction the attitude control in the imaging direction of the camera 11 is performed in advance. As the result, after passing through the point Z1, the traffic light P1 can be captured within the image R1 without performing the attitude control in the imaging direction of the camera 11.

Next, in order to compare with the attitude control in the imaging direction of the camera 11 illustrated in FIGS. 11(a)-11(c), a case where the imaging direction of the camera 11 is changed only on the basis of the moving direction of the traffic light P1 within the image R1, i.e., a case where the imaging direction of the camera 11 is changed without estimating the traveling route of the vehicle 51, will be explained with reference to FIG. 13(a)-13(d). FIG. 13(a) illustrates the position of the vehicle 51 and the curve road X2 which is the traveling route of this vehicle 51, and is the same view as FIG. 11(a). Then, when the traffic light P1 is present on the lower left within the image R1 and this traffic light P1 is to move to the left as indicated by reference sign b1 of FIG. 13(b), the imaging direction of the camera 11 is changed so that the traffic light P1 is located on the right side of the image R1 as indicated by reference sign c1 of FIG. 13(c).

Subsequently, once the vehicle 51 has reached the point Z2, the traffic light P1 will move to the upper-right direction this time as indicated by reference sign c2. Accordingly, when the vehicle 51 has reached the point Z3, the possibility for the traffic light P1 to frame out from within the image R1 will increase as indicated by reference sign c3. Accordingly, at the time point when the vehicle 51 has reached the point Z3, the imaging direction of the camera 11 is changed so that the traffic light P1 will be located on the left side of the image R1 as indicated by reference sign d1 of FIG. 13(d). Then, at the time point when the vehicle 51 has reached the point Z4, the traffic light P1 will be located at the generally center of the image R1 as indicated by reference sign d2 of FIG. 13(d).

As explained above, in the example illustrated in FIGS. 13(a)-13(d), although framing-out of the traffic light P1 from within the image R1 can be avoided, the imaging direction is changed twice until the vehicle 51 reaches the point Z4 from the point Z1. As the result, the time required for the attitude control in the imaging direction of the camera 11 increases, and thus the accuracy to detect the lighting state of the traffic light P1 might decrease.

In contrast, in the traffic light recognition device according to the second embodiment, the attitude in the imaging direction of the camera 11 is controlled on the basis of the curve road X2 which is the traveling route of the vehicle 51, and therefore as illustrated in FIGS. 11(a)-11(c), if the imaging direction of the camera 11 is changed at the time point when the vehicle 51 has reached the point Z1 which is the point sufficiently away from the traffic light P1, subsequently the traffic light P1 will not frame out from the image R1. Accordingly, the need to change the imaging direction of the camera 11 after the vehicle 51 has approached the traffic light P1 is eliminated.

In this manner, in the traffic light recognition device 100 according to the second embodiment, the imaging direction setting unit 13 includes the traveling route determination unit 26, which estimates the traveling route of the vehicle 51 in advance, to thereby predict the moving range of the traffic light P1 within the image R1. That is, the moving range in the future on the image of the traffic light is predicted. Then, on the basis of this moving range, the imaging direction of the camera 11 is changed so that the traffic light will not frame out.

Accordingly, even in a case where the traffic light P1 complicatedly moves within the image R1, such as a case where the vehicle 51 travels on a curve road, framing-out of the traffic light P1 can be avoided with the minimum necessary change of the imaging direction. As the result, the need to change the imaging direction of the camera 11 at the point Z2 to point Z4 approaching the traffic light P1 is eliminated, and therefore a change of the lighting state of the traffic light P1 can be reliably detected to reliably determine whether to stop at or travel through an intersection.

[Explanation of Third Embodiment]

Next, a third embodiment of the present invention will be explained. In the above-described first embodiment and second embodiment, it is shown that the imaging direction of the camera 11 is changed at the point Z1, which is a point sufficiently far from the intersection where the traffic light P1 is present, to eliminate the subsequent need to change the imaging direction of the camera 11.

In the third embodiment, assuming that the vehicle 51 is being automatically operated, and an area (hereinafter referred to as a "change restriction area") for restricting changing the imaging direction of a camera is set in front of the traffic light P1. Then, control is made so that the traffic light P1 will not frame out from within the image R1 without changing the imaging direction of the camera 11 within this change restriction area. Hereinafter, the third embodiment will be explained in detail with reference to FIG. 14 and FIG. 15. Note that, since the device configuration is the same as those of FIG. 1 to FIG. 3 illustrated in the first embodiment, the explanation thereof will be omitted.

FIG. 14(a) is an explanatory view illustrating a change restriction area Q1 set in front of the traffic light P1. In approaching the traffic light P1, the automatically-operated vehicle 51 monitors the lighting state (red, green lighting state, etc.) of this traffic light P1, and determines, in accordance with this lighting state, whether to stop the vehicle 51 or to allow the vehicle 51 to continue to travel as it is. The area which requires this determination is set as the above-described change restriction area Q1. That is, once the imaging direction of the camera 11 is changed, the accuracy to detect the lighting state will decrease, and therefore the area which requires this determination is set as the change restriction area Q1 so that the lighting state of the traffic light P1 can be accurately detected. Here, the change restriction area Q1 can be set on the basis of the stop position provided with respect to the traffic light P1, the traveling speed of the vehicle 51, the vehicle current position information D05, and the map information D02.

For example, as illustrated in FIG. 14(a), at the point Z1 where the vehicle has not reached the change restriction area Q1 there is a sufficient distance from the vehicle 51 to the traffic light P1, and therefore changing the imaging direction of the camera 11 would not affect the detection of the lighting state of the traffic light P1. Furthermore, at the point Z2 where the vehicle 51 has passed through the change restriction area Q1, the determination of whether the vehicle 51 is to stop or to continue to travel is already finished, and therefore changing the imaging direction of the camera 11 will not have a large effect on traveling control for the automatic operation of the vehicle 51.

Accordingly, in the third embodiment, the change restriction area Q1 is set, and the attitude of the camera 11 is controlled so as to change the imaging direction of the camera 11 at the points other than this change restriction area Q1.

Specifically, at the point Z1 the traffic light P1 present within the image R1 is present on the slightly right side of the center as indicated by reference sign b1 of FIG. 14(b), and therefore at this time point it is determined that the traffic light P1 will not frame out. However, since the vehicle 51 has reached the point Z1 which is just in front of the change restriction area Q1, the imaging direction of the camera 11 is changed at this time point. As the result, the traffic light P1 is controlled so as to be located on the lower left within the image R1 as indicated by reference sign c1 of FIG. 14(c). Subsequently, before the vehicle 51 passes through the inside of the change restriction area Q1 and reaches the point Z2, the traffic light P1 can be captured without framing out from within the image R1, as indicated by the reference signs c2 and c3 of FIG. 14(c).

In contrast, in the case where the change restriction area Q1 is not set, the imaging direction of the camera 11 will be changed within the change restriction area Q1 as illustrated in FIGS. 15(a)-15(c). That is, at the time point when the vehicle 51 has reached the point Z1 in FIG. 15(a), the traffic light P1 is present on the slightly right side of the center of the image R1 as indicated by reference sign b1 of FIG. 15(b), and therefore it is not determined that this traffic light P1 will frame out from within the image R1. Then, it is determined that the traffic light P1 frames out at the time point when it is located at the right end of the image R1 (when the vehicle 51 is located within the change restriction area Q1 at FIG. 15(a)), as indicated by reference sign b2. Therefore, at this time point the imaging direction of the camera 11 will be changed.

As the result, the traffic light P1 is controlled so as to come to the lower left of the image R1 as indicated by reference sign c1 of FIG. 15(c). As the vehicle 51 further travels, at the time point when the vehicle 51 has reached the point Z2 the traffic light P1 is located on the slightly right side of the center within the image R1, as indicated by the reference sign c2 of FIG. 15(c). In this case, the imaging direction of the camera 11 will be changed within the change restriction area Q1 in which the recognition result of the lighting state of the traffic light P1 is required.

Accordingly, the imaging direction of the camera 11 is changed within the area, in which the determination of whether the vehicle 51 is to stop or to continue to travel in accordance with the lighting state of the traffic light P1 is required, and this changing the imaging direction might reduce the accuracy to detect the traffic light P1.

In the traffic light recognition device 100 according to the third embodiment, since the change restriction area Q1 is set in front of the traffic light P1 as illustrated in FIGS. 14(a)-14(c) and changing the imaging direction of the camera 11 within this change restriction area Q1 is prohibited, it is possible to prevent the traffic light P1 from framing out from within the image R1 and accurately detect the lighting state of the traffic light P1. As the result, whether to stop the vehicle 51 or to allow the vehicle 51 to travel can be appropriately determined.

Moreover, the change restriction area Q1 changes in accordance with the vehicle speed, deceleration G, and the distance to the stop line. By setting the change restriction area Q1 in accordance with this change, a timing to require the recognition result of the traffic light P1 and a timing to change the imaging direction of the camera 11 can be reliably shifted from each other.

[Explanation of Modified Example of Third Embodiment]

In the above-described third embodiment, the control is made so as to prevent the traffic light P1 from framing out from within the image R1 by setting the change restriction area Q1 for prohibiting changing the imaging direction of the camera 11 in front of the traffic light P1 and by changing the imaging direction of the camera 11 at a time point before the vehicle 51 reaches this change restriction area Q1.

The detection of the lighting state of the traffic light P1 is executed for each predetermined calculation cycle, and only an image, among the images captured by the camera 11, for example at the starting time point of the calculation cycle may be used. In such a case, in a time zone, in which an image captured by the camera 11 within this calculation cycle is not used, even changing the imaging direction of the camera 11 would not affect the detection of the lighting state of the traffic light P1.

Then, in the traffic light recognition device according to the modified example, while the vehicle 51 is traveling within the change restriction area Q1 the time zone is classified into a time zone (hereinafter referred to as an "image use time zone") in which an image captured by the camera 11 is used, and a time zone (hereinafter referred to as a "change time zone") in which an image captured by the camera 11 is not used and the imaging direction of the camera 11 can be changed, and a change prohibition area is set only in the "image use time zone" so as to prohibit changing the imaging direction.

Specifically, as illustrated in FIG. 16(a), within the change restriction area Q1 an area Qa corresponding to the "image use time zone" and an area Qb corresponding to the "change time zone" are set. These areas Qa and Qb can be set on the basis of the traveling speed of the vehicle 51 and the calculation cycle in the traffic light recognition unit 14. Then, for the area Qb, changing the imaging direction of the camera 11 is allowed.

Accordingly, for example the point Z2 within the change restriction area Q1 is located within the area Qb, so the imaging direction of the camera 11 can be changed. Accordingly, when the vehicle 51 is traveling at the point Z1 as illustrated in FIG. 16(b), the imaging direction of the camera 11 is not changed because the traffic light P1 will not frame out as indicated by reference sign b1 of FIG. 16(b). Then, at the time point when the vehicle 51 has reached the point Z2, it is determined that the traffic light P1 will frame out from the image R1 as indicated by reference sign b2, so the imaging direction of the camera 11 is changed. As the result, the traffic light P1 will be located on the lower left within the image R1 as indicated by reference sign c1 of FIG. 16(c), and subsequently the traffic light P1 will not frame out from the image R1 even when the vehicle 51 reaches the point Z3, as indicated by reference sign c2 of FIGS. 16(a)-16(c).

In this manner, in the traffic light recognition device 100 according to the modified example of the third embodiment, the area Qa corresponding to the "image use time zone" and the area Qb corresponding to the "change time zone" are set on the basis of the calculation cycle of the traffic light recognition unit 14, and for the area Qb, changing the imaging direction of the camera 11 is allowed. Accordingly, even when the vehicle 51 enters the change restriction area Q1, the imaging direction of the camera 11 can be changed during traveling within the area Qb, and framing-out of the traffic light P1 from within the image R1 can be more reliably avoided.

[Explanation of Fourth Embodiment]

Next, a fourth embodiment of the present invention will be explained. Note that, since the device configuration is the same as those of FIG. 1 to FIG. 3 illustrated in the first embodiment, the explanation thereof will be omitted.

In the fourth embodiment, when there are two traffic lights to be monitored, the attitude control in the imaging direction of the camera 11 is performed so that both the traffic lights will not frame out from an image. Hereinafter, the fourth embodiment will be explained in detail with reference to FIGS. 17(a)-17(c). As illustrated in FIG. 17(a), when there are two traffic lights P1 and P2 along a traveling path X3 of the vehicle 51 and both the traffic lights can be imaged, the attitude control in the imaging direction of the camera 11 is performed so that both the traffic lights P1 and P2 will not frame out from an image R1.

Accordingly, when the vehicle 51 has reached the point Z1, the image R1 is obtained in which two traffic lights P1 and P2 are present as indicated by reference sign b1 of FIG. 17(b). Subsequently, when the vehicle 51 has reached the point Z2, it is determined that the traffic light P2 will frame out from the image R1 as indicated by reference sign b2. In this case, the imaging direction of the camera 11 is changed at this point Z2. As the result, as indicated by the reference sign c1 of FIG. 17(c), the imaging direction of the camera 11 is set and the attitude in this direction is controlled so that traffic lights P1 and P2 are located on the left side within the image R1. That is, the control is made so that the left-side traffic light P1 among two traffic lights P1 and P2 is located on the left side of the image R1 and both the traffic lights P1 and P2 will not frame out.

Furthermore, when the vehicle 51 has reached the point Z3, it is determined that the traffic light P2 will frame out from the image R1, as indicated by reference sign c2 of FIG. 17(c). In this case, the imaging direction of the camera 11 is changed at this point Z3. As the result, as indicated by reference sign d1 of FIG. 17(d), the imaging direction of the camera 11 is set and the attitude in this direction is controlled so that traffic lights P1 and P2 are located on the left side within the image R1.

Subsequently, when the vehicle 51 has reached the point Z4, it is determined that the traffic light P2 will frame out from within the image R1, as indicated by reference sign d2 of FIG. 17(d). In this case, the imaging direction of the camera 11 is changed at this point Z4. As the result, as indicated by reference sign e1 of FIG. 17(e), the imaging direction of the camera 11 is set and the attitude in this direction is controlled so that traffic lights P1 and P2 are located on the left side within the image R1. Then, at the time point when the vehicle 51 has reached a point Z5, both the traffic lights P1 and P2 are captured without framing out from within the image R1.

In this manner, in the traffic light recognition device 100 according to the fourth embodiment, even when there are two traffic lights P1 and P2, each of the traffic lights P1 and P2 can be continued to be displayed without framing out from the image R1. Here, in the example illustrated in FIGS. 17(a)-17(c), the attitude control in the imaging direction of the camera 11 is performed at the three points Z2, Z3, and Z4 illustrated in FIG. 17(a). Such attitude control in the imaging direction of the camera 11 is executed in the area Qb corresponding to the period in which the image captured by the camera 11 of the signal recognition processing is not used, as illustrated in FIGS. 16(a)-16(c) described above, so that the imaging direction of the camera 11 can be changed without affecting the detection accuracy of the state of a traffic light.

Note that, in the fourth embodiment described above, an example has been explained in which when there are two traffic lights P1 and P2, the imaging direction of the camera 11 is set and the attitude in this direction is controlled so that each of these traffic lights P1 and P2 will not frame out from the image R1. However, the present invention is not limited to the case where there are two traffic lights, but can be similarly applicable to the cases where there are three or more traffic lights.

[Explanation of Fifth Embodiment]

Next, a fifth embodiment of the present invention will be explained. Note that, since the device configuration is the same as those of FIG. 1 to FIG. 3 illustrated in the first embodiment, the explanation thereof will be omitted.

In the fifth embodiment, when there are two traffic lights to be monitored and both the traffic lights are synchronously operated, the imaging direction of the camera 11 is set and the attitude in this direction is controlled so as not to preferentially frame out the traffic light, among the two traffic lights, whose movement amount within the image R1 is smaller. Hereinafter, the fifth embodiment will be explained in detail with reference to FIGS. 18(a)-18(c). As illustrated in FIG. 18(a), when there are two traffic lights P1 and P2 along the traveling path of the vehicle 51, each of the traffic lights P1 and P2 will be captured in the center of the image R1 captured at the point Z1 by the camera 11, as indicated by reference sign b1 of FIG. 18(b). Then, when each of the traffic lights P1 and P2 is synchronously operated, i.e., when the lighting colors change at the same timing, the attitude control in the imaging direction of the camera 11 is performed so that the traffic light P1, among the respective traffic lights P1 and P2, whose movement amount within the image R1 is estimated to be smaller, will not frame out from the image R1.

That is, at the time point when the vehicle 51 has reached the point Z2, the attitude control in the imaging direction of the camera 11 is not performed even when it is determined that the traffic light P2 will frame out, as indicated by the reference sign b2 of FIG. 18(b). Then, at the time point when the vehicle 51 has reached the point Z3, when it is determined that the traffic light P1 will frame out, as indicated by the reference sign b3, the attitude control in the imaging direction of the camera 11 is performed so that the traffic light P1 will be located on the left side of the image R1, as indicated by the reference sign c1 of FIG. 18(c). Subsequently, when the vehicle 51 has reached the points Z4 and Z5, the traffic light P1 will be captured without framing out from the image R1, as indicated by the reference signs c2 and c3, respectively. As the result, the lighting state of traffic light P1 can be reliably recognized. Not to mention that since the traffic light P2 is synchronously operated with the traffic light P1, there is no problem even if the lighting state of the traffic light P2 cannot be detected.

Moreover, the attitude control in the imaging direction of the camera 11 at the point Z3 is executed in the area Qb corresponding to the period in which the image captured by the camera 11 of the signal recognition processing is not used, as illustrated in FIGS. 16(a)-16(c) described above, so that the imaging direction of the camera 11 can be changed without affecting the detection accuracy of the state of a traffic light.

In this manner, in the traffic light recognition device according to the fifth embodiment, when two traffic lights P1 and P2 synchronously operated with each other are present within the image R1 captured by the camera 11, the control is made so that one (traffic light P1 in the aforementioned example) of the traffic lights will not frame out from the image R1. Therefore, the number of times of changing the imaging direction of the camera 11 can be reduced and the lighting state of a traffic light can be reliably detected.

In the foregoing, the traffic light recognition device and traffic light recognition method of the present invention have been explained on the basis of the illustrated embodiments, but the present invention is not limited thereto. The configuration of each unit can be replaced with any configuration having a similar function.

REFERENCE SIGNS LIST 11 camera (imaging unit)
12 vehicle current position detector
13 imaging direction setting unit
14 traffic light recognition unit
21 traffic light position estimator
22 position change amount calculator
23 imaging attitude setting unit
24 camera attitude controller
25 detection area calculator
26 traveling route determination unit
51 vehicle
100 traffic light recognition device
D01 landmark information
D02 map information
D03 camera information
D04 traffic light information
D05 vehicle current position information
D06 detection area information
D07 image data
D08 detection position information
D09 detection position change information
D10 imaging attitude information
D11 attitude information
D12 traveling route information
P1, P2 traffic light
Q1 change restriction area
R1 image
X1 traveling path
X2 curve road
X3 traveling path

The invention claimed is:

1. A traffic light recognition device, comprising:
a camera mounted on a vehicle and configured to capture an image around the vehicle;
a processor; and
a memory coupled to the processor, the memory storing instructions which, when executed by the processor:
acquire map information around the vehicle;
detect a current position on a map of the vehicle;
estimate a position on an image of a traffic light on a basis of the current position and the map information;

set an imaging direction of the camera on a basis of the position on the image of the traffic light and of a moving direction in the future on the image of the traffic light;

change the imaging direction of the camera to the set imaging direction;

recognize the traffic light from an image captured in the imaging direction by the camera;

set a change point or region at which the imaging direction of the camera is changed, on a basis of the position on the image of the traffic light and of the moving direction in the future on the image of the traffic light; and change the imaging direction when the vehicle reaches the change point or region.

2. The traffic light recognition device according to claim 1, wherein the memory further stores instructions which, when executed by the processor:

set an imaging direction of the camera on a basis of the position on the image of the traffic light and of a moving range in the future on the image of the traffic light.

3. The traffic light recognition device according to claim 1, wherein the memory further stores instructions which, when executed by the processor:

calculate a change amount in the imaging direction from the position on the image of the traffic light and on the moving range in the future on the image of the traffic light, and sets an imaging direction on a basis of an imaging range of the camera and the change amount.

4. The traffic light recognition device according to claim 2, wherein the memory further stores instructions which, when executed by the processor:

predict a moving range in the future on the image of the traffic light on a basis of a traveling route in the future of the vehicle.

5. The traffic light recognition device according to claim 1, wherein the memory further stores instructions which, when executed by the processor:

set, when a plurality of traffic lights can be imaged by the camera, an imaging direction of the camera so that the plurality of traffic lights is included on the image.

6. The traffic light recognition device according to claim 1, wherein the memory further stores instructions which, when executed by the processor:

set, on a basis of a distance from a stop position provided for the traffic light to the vehicle and of a traveling speed of the vehicle, a change restriction area for restricting changing the imaging direction of the camera, and changes the imaging direction of the camera before entering this change restriction area.

7. The traffic light recognition device according to claim 1, wherein the memory further stores instructions which, when executed by the processor:

set, on a basis of a distance from a stop position provided for the traffic light to the vehicle, and of a traveling speed of the vehicle, and of a calculation cycle to recognize a traffic light, a "change time zone" in the imaging direction of the camera; and change the imaging direction of the camera within the "change time zone".

8. A traffic light recognition method, comprising the steps of:

capturing, by an camera, an image around a vehicle;

acquiring map information around the vehicle;

detecting a current position on a map of the vehicle;

estimating a position on an image of a traffic light on a basis of the current position and the map information;

setting an imaging direction of the camera on a basis of the position on the image of the traffic light and of a moving direction in the future on the image of the traffic light;

changing the imaging direction of the camera to a set imaging direction;

recognizing the traffic light from an image captured in the imaging direction by the camera;

setting a change point or region at which the imaging direction of the camera is changed, on a basis of the position on the image of the traffic light and of the moving direction in the future on the image of the traffic light; and changing the imaging direction of the camera when the vehicle reaches the change point or region.

* * * * *